(12) United States Patent
Smith

(10) Patent No.: US 6,398,251 B1
(45) Date of Patent: *Jun. 4, 2002

(54) AXLELESS VEHICLE SUSPENSION SYSTEM

(75) Inventor: Earl Dallas Smith, Greencastle, IN (US)

(73) Assignee: Dallas Smith Corporation, Greencastle, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/318,428

(22) Filed: May 25, 1999

Related U.S. Application Data

(63) Continuation-in-part of application No. 09/193,501, filed on Nov. 17, 1998, now abandoned, which is a continuation of application No. 08/792,972, filed on Jan. 31, 1997, now Pat. No. 5,839,750.
(60) Provisional application No. 60/086,899, filed on May 27, 1998.

(51) Int. Cl.$^7$ ................................................. B60G 5/00
(52) U.S. Cl. ............................. 280/683; 280/124.128; 280/86.753
(58) Field of Search .................. 280/124.116, 124.128, 280/124.132, 124.157, 43.18, 678, 683, 86.5, 86.753

(56) References Cited

U.S. PATENT DOCUMENTS

| | | | |
|---|---|---|---|
| 2,001,846 A | 5/1935 | Ledwinka | |
| 2,050,693 A | 8/1936 | Favary | 267/19 |
| 2,069,399 A | 2/1937 | White | 267/19 |
| 2,254,552 A | 9/1941 | Tjaarda | 172/291 |
| 2,286,609 A | 6/1942 | Ledwinka | |
| 2,386,988 A | 10/1945 | Sullivan | |
| 2,507,980 A | 5/1950 | Knapp | 280/124 |
| 2,575,065 A | 11/1951 | Merry | 280/104.5 |
| 2,612,387 A | 9/1952 | Ronning | 280/104.5 |
| 2,794,650 A | 6/1957 | Schilberg | |
| 2,861,811 A | 11/1958 | Lassen | |
| 2,862,724 A | 12/1958 | Stover | 280/124 |
| 2,877,010 A | 3/1959 | Gouirand | |
| 2,988,374 A | 6/1961 | Boyles | 280/124 |
| 3,078,104 A | 2/1963 | Chalmers | 280/124 |
| 3,140,880 A | 7/1964 | Masser | 280/124 |
| 3,277,975 A | 10/1966 | Van Winsen | 180/73 |
| 3,331,627 A | 7/1967 | Schroder | |
| 3,356,386 A | 12/1967 | Taylor | 280/106.5 |
| 3,361,443 A | 1/1968 | Wolf | 280/104.5 |
| 3,573,882 A | 4/1971 | Van Winsen | 280/124 |
| 3,704,898 A | 12/1972 | Schmidt | 280/124 |

(List continued on next page.)

FOREIGN PATENT DOCUMENTS

| | | |
|---|---|---|
| BE | 623.587 | 10/1962 |
| FR | 778.246 | 3/1935 |
| FR | 1.385.600 | 12/1964 |
| GB | 628328 | 8/1949 |
| GB | 657466 | 9/1951 |
| GB | 692854 | 6/1953 |
| GB | 881196 | 11/1961 |
| GB | 2209715 | 5/1989 |
| NL | 8401218 | 11/1985 |
| SE | 98/18640 | * 5/1998 |
| SU | 1213-625 A | 9/1986 |
| WO | WO 97/12769 | 4/1997 |

*Primary Examiner*—Kenneth R. Rice
*Assistant Examiner*—Lynda Jasmin
(74) *Attorney, Agent, or Firm*—Woodard, Emhardt, Naughton, Moriarty & McNett

(57) ABSTRACT

A wheel suspension system including a wheel support pivotally attached to a vehicle frame at two, laterally-spaced locations, the wheel support being pivotal between an uppermost and a lowermost position. The wheel support is biased to a position intermediate of the uppermost and lowermost positions by a spring. The spring urges apart a spring support of the wheel support from the vehicle frame, the spring support being below the rotational axis of the wheel. The pivotal axes of the pivotal attachments are located below the rotational axis of the wheel.

69 Claims, 24 Drawing Sheets

U.S. PATENT DOCUMENTS

| | | | |
|---|---|---|---|
| 3,713,665 A | 1/1973 | Gouirand ................... 280/124 |
| 3,797,850 A | 3/1974 | Stout et al. |
| 3,884,502 A | 5/1975 | Wagner ..................... 280/415 |
| 3,904,219 A | 9/1975 | Guerriero .................. 280/124 |
| 3,961,826 A | 6/1976 | Sweet et al. ................ 301/125 |
| 4,032,167 A | 6/1977 | Chereda .................... 280/106 |
| 4,047,736 A | 9/1977 | Prive ........................ 280/683 |
| 4,061,353 A | 12/1977 | Kingman et al. |
| 4,089,384 A | 5/1978 | Ehrenberg |
| 4,095,818 A | 6/1978 | Smith ....................... 280/789 |
| 4,166,640 A | 9/1979 | Van Denberg ............. 280/711 |
| 4,202,564 A | 5/1980 | Strader ..................... 280/678 |
| 4,252,340 A | 2/1981 | Egging ..................... 280/682 |
| 4,273,357 A | 6/1981 | Pashkow ................... 280/697 |
| 4,473,238 A | 9/1984 | Antoine |
| 4,558,886 A | 12/1985 | Straub ...................... 280/711 |
| 4,580,798 A | 4/1986 | Roelofs ........................ 280/6 |
| 4,593,930 A | 6/1986 | Davis ....................... 280/690 |
| 4,615,539 A | 10/1986 | Pierce |
| 4,619,578 A | 10/1986 | Routledge ................. 414/498 |
| 4,666,181 A | 5/1987 | Wegner .................... 280/711 |
| 4,718,692 A | 1/1988 | Raidel ...................... 280/713 |
| 4,736,958 A | 4/1988 | Armstrong ................. 280/6 R |
| 4,878,691 A | 11/1989 | Cooper et al. ............. 280/189 |
| 4,934,733 A | 6/1990 | Smith et al. ............... 280/711 |
| 5,016,912 A | 5/1991 | Smith et al. ............... 280/711 |
| 5,083,812 A * | 1/1992 | Wallace .................... 280/683 |
| 5,275,430 A | 1/1994 | Smith ....................... 280/711 |
| 5,366,237 A | 11/1994 | Dilling et al. ............. 280/711 |
| 5,379,842 A | 1/1995 | Terry ......................... 180/21 |
| 5,409,069 A | 4/1995 | Hake ........................ 172/400 |
| 5,433,287 A | 7/1995 | Szalai et al. ............... 180/353 |
| 5,505,278 A | 4/1996 | Smith ....................... 180/246 |
| 5,746,441 A * | 5/1998 | VanDenberg ......... 280/124.116 |
| 5,758,896 A | 6/1998 | Cruise ...................... 280/695 |
| 5,836,597 A * | 11/1998 | Schlosser et al. ....... 280/86.753 |
| 5,839,750 A | 11/1998 | Smith ....................... 280/630 |
| 5,887,880 A | 3/1999 | Mullican et al. |
| 5,921,568 A | 7/1999 | Cruise et al. ......... 280/124.134 |
| 6,073,946 A * | 6/2000 | Richardson ................ 280/86.5 |
| 6,142,496 A * | 11/2000 | Bartel ................. 280/124.128 |
| 6,170,875 B1 | 1/2001 | Jones et al. |
| 6,213,507 B1 | 4/2001 | Ramsey et al. |

\* cited by examiner

AXLELESS VEHICLE SUSPENSION SYSTEM

CROSS-REFERENCE TO RELATED APPLICATIONS

This application is a continuation-in-part application of my application Ser. No. 09/193,501, filed Nov. 17, 1998, now abandoned, entitled LEAF SPRING WHEEL SUSPENSION SYSTEM, which is a continuation of Ser. No. 08/792,972, filed Jan. 31, 1997, entitled LEAF SPRING WHEEL SUSPENSION SYSTEM, which issued as U.S. Pat. No. 5,839,750 on Nov. 24, 1998. This application claims priority to U.S. provisional patent application Ser. No. 60/086,899, filed May 27, 1998. All of the above-referenced applications are incorporated herein by reference.

BACKGROUND OF THE INVENTION

Field of the Invention

This invention relates to the field of wheel suspensions, and particularly to wheel suspension systems that independently support the wheels of a vehicle in which a wide and low cargo floor is desired. This invention is an improvement to the wheel suspension systems described in my earlier patents, namely, U.S. Pat. No. 4,878,691, issued on Nov. 7, 1989, U.S. Pat. No. 4,934,733, issued on Jun. 19, 1990, U.S. Pat. No. 5,016,912, issued on May 21, 1991, and U.S. Pat. No. 5,275,430, issued on Jan. 4, 1994, all incorporated herein by reference.

For a variety of reasons, it is frequently desirable to have the cargo floor of a trailer, van, or similar vehicle as low as reasonably possible. A low floor provides for more efficient transportation of cargo, giving a vehicle more useable, internal space for given exterior dimensions. Also, a low floor placed close to the road surface makes for easier access to the vehicle. These and other advantages of a low cargo floor have motivated various proposals for low vehicle floors.

In U.S. Pat. No. 4,032,167, there is disclosed a trailer for transporting motorcycles. This trailer includes wheels mounted to fixed spindles that are bolted to a rigid frame. Because of this rigid attachment, considerable forces are imparted to the frame. Further, rigidly fixed wheels will have undesirable effects on the handling and ride comfort of a vehicle.

In another type of suspension system, the vehicle is supported on a through axle that extends the width of the vehicle below the vehicle frame. Examples of this are found in U.S. Pat. Nos. 4,580,798 and 4,615,539. Because the axle extends the entire width of the vehicle, the cargo space of the vehicle must be adapted to fit over the axle. Thus, the axle and the diameter of the wheel establish the height of the cargo floor above the ground.

In a different type of wheel suspension system, the through axle extending the width of the vehicle is replaced with short, independent axles present only at the sides of the vehicle. An example of this is shown in U.S. Pat. No. 4,666,181. This short independent axle is attached to a support arm, which is pivotably attached to the vehicle frame. With this type of suspension, the axle and wheel diameter no longer create a minimum height for the vehicle cargo floor. Other considerations, such as ground clearance, establish the height of the cargo floor. The suspension system components reside in or around the wheel well. This area around the wheel well, however, still represents limitations to the cargo area. Further compaction of the wheel suspension system will result in more efficient and convenient use of cargo space.

SUMMARY OF THE INVENTION

Briefly describing one aspect of the present invention there is provided an apparatus comprising a wheel, a wheel support, and an air spring. The wheel support is pivotally attached to the vehicle frame and is pivotable between a first position and a second position. The wheel support rotatably supports the wheel by the rotational axis. The wheel support includes an air spring support. The air spring urges the wheel support apart from the vehicle frame. The wheel support receives the air spring in the air spring support. The air spring support is located below the rotational axis. The wheel support may be of the trailing-arm type, in which the rotational axis is rearward of the pivot axis, or the leading-arm type, in which the rotational axis is forward of the pivot axis.

Briefly describing another aspect of the present invention, a wheel support is coupled to the frame by a pivotal attachment which permits adjustment of the camber angle of the wheel. Another aspect of the present invention concerns a wheel support that is pivotally coupled to a frame such that the pivotal attachment permits adjustment of the toe-in angle of the wheel. In another aspect of the present invention, a wheel support is pivotally attached to a cross-member of a frame, the cross-member being lower than the rotational axis of the wheel. In another aspect of the present invention, a wheel support is coupled to a transfer structure by first and second pivotal attachments that are located forward of the rotational axis. A spring is coupled to the wheel support below the rotational axis, and is also coupled to the transfer structure. Yet another aspect of the present invention includes a wheel support with a pivot axis located below the rotational axis. An air spring positioned between the frame and the wheel support is operably coupled to a source of compressed air. Another aspect of the present invention includes a wheel support pivotally attached to a frame, and a shock absorber for dampening motion of the wheel support, the shock absorber being located substantially below the rotational axis of the wheel. In yet another aspect of the present invention, there is a vehicle with multiple wheels for supporting the vehicle from the ground. The wheels are arranged on either side of the vehicle, such that the rotational axes of the wheels are not coincident.

These and other aspects of the present invention will be apparent from the following description of the preferred embodiment, the drawings, and the claims.

DESCRIPTION OF THE PREFERRED EMBODIMENT

Figure 1:
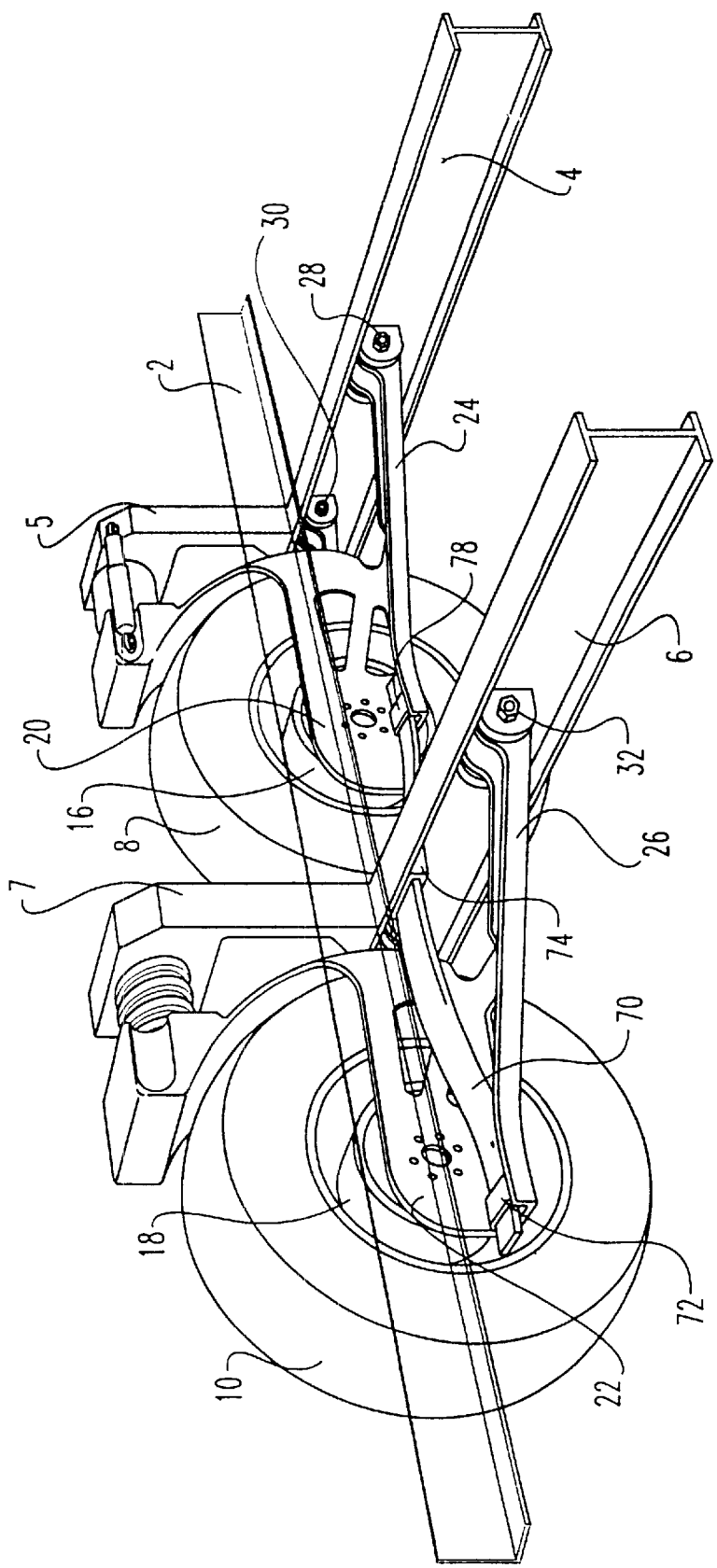
FIG. 1 is a perspective view of a pair of wheel suspension systems constructed in accordance with one embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention provides a wheel suspension system which has an extremely low profile. The suspension system utilizes a wheel support that is connected with the vehicle frame at points of attachment on the frame which are spaced apart laterally, thereby providing lateral support for the wheel. The wheel support is pivotable between an uppermost position and a lowermost position. One or two biasing means are included to maintain the wheel support in an intermediate position and to absorb loads from the wheel.

Referring in particular to FIG. 1, there is shown a wheel suspension system constructed in accordance with the present invention. The system includes a pair of wheels mounted to a vehicle frame by respective wheel supports. The wheel supports are maintained in position by a leaf spring secured between the wheel support and the frame.

The two wheels are shown mounted on the same side of the vehicle, and of course similar wheels and suspension systems are used on the opposite side of the vehicle. It will further be appreciated that the present invention is equally useful when only one wheel is supported on each side of the vehicle. Also, the embodiment of FIG. 1 utilizes a single leaf spring, but could equally use separate biasing means serving the function of the spring.

The wheels are attached to cross members of the vehicle frame by wheel supports. The wheel supports attach to the cross member at a pair of pivot points, with one pivot point being inboard of the other pivot point. This lateral displacement of one pivot point relative to the other promotes the lateral stability of the wheel support. The frame cross members are held in position by a longitudinal member of the frame.

The wheel support connects to the frame cross member on a portion of the support that is largely horizontal and parallel to the roadway. The wheel support also has a section that is largely vertical relative to the roadway, to which the wheel, spring and shock absorber are attached. The spring and shock absorber attach to the vertical portion of the wheel support and also a vertical member of the frame. The upright portion of the wheel support is adaptable to springs such as the coil type, air bag type, or any other type of spring that creates a spring force when its attachment points are displaced relative to each other.

There is an additional spring that acts between the wheel support and the frame. This spring is of the leaf type, and attaches to both the horizontal portion of the wheel support and also to the frame. In a preferred embodiment, the attachment of the spring to the wheel support permits relative sliding of the spring within the wheel support in the fore and aft directions, but otherwise transmits spring forces created by the pivoting of the wheel support relative to the frame cross member. Alternative attachments of the leaf spring may be used, including an attachment by which one end of the spring is secured to a wheel support and the portion connected with the vehicle frame is allowed to slide relative thereto. Additionally, a spring configuration and attachment could be employed in which all attachments of the spring prevent or allow for sliding movement.

It is a feature of the leaf spring design that a biasing device is provided that fits generally within the typical vehicle frame. The leaf spring is located interior of the frame perimeter. It is also positioned below the upper surface of the frame, and thereby does not intrude into space available above the frame for the bed of the vehicle, e.g., the floor of a trailer or van. As shown in FIG. 1, the leaf spring is conveniently received through an opening in a frame member, thus accommodating the position of the leaf spring and minimizing the space required for the spring.

This leaf spring may be used simultaneously with adjacent wheels. The spring can attach, slidably or not, to two wheel supports and also be attached to a cross member of the frame in-between the two wheel supports.

The present invention provides a wheel suspension system useful in a variety of applications. The preferred embodiment is characterized by a wheel support with a largely vertical portion and a largely horizontal portion. The vertical portion is generally outboard of the vehicle frame. The horizontal portion is below or within much of the vehicle frame. Also, the shock absorber and springs of the preferred embodiment are similarly situated either outboard of much of the vehicle frame, or below or within much of the vehicle frame. This general arrangement permits maximum utilization of the area inboard and above most of the frame as useful cargo area. The wheel suspension system is useful, for example, for mounting the wheels of a trailer, or for the rear wheels of a front-wheel drive vehicle, such as a van.

Referring in particular to FIG. 1, there is depicted a preferred embodiment of the present invention in a perspective view. Frame outboard longitudinal member 2, shown with an "L" cross section, is a major structural member of the vehicle frame traversing fore and aft along one side of the vehicle and defining an outer perimeter of the frame. Attached to it are frame cross members 4 and 6, located fore and aft of each other, respectively. These cross members traverse the width of the vehicle, and typically terminate at the mirror image wheel suspension system on the other side of the vehicle frame. The frame cross members include frame vertical members 5 and 7, respectively, located outboard of longitudinal member 2.

Wheel suspension systems according to the present invention are mounted to the vehicle frame in the following manner. The wheel suspension systems include, for example, wheel supports 24 and 26. The supports carry stub axles or the like to support wheels thereon. In turn, the wheel supports are mounted to the vehicle frame for pivoting about a horizontal axis, thereby allowing the carried wheel to move up and down with respect to the vehicle frame.

Figure 3:
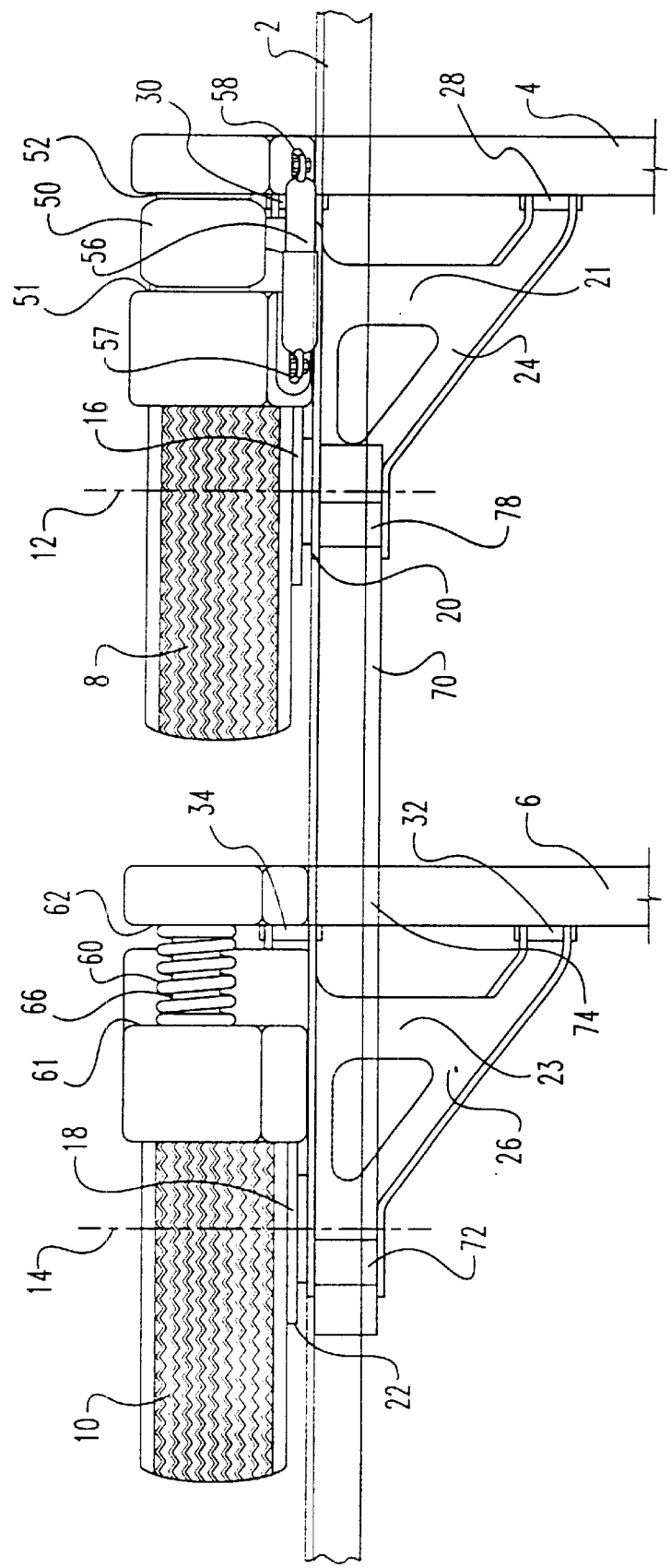
FIG. 3 is a top plan view of the wheel assemblies of FIG. 1.

Located just aft of the cross members are wheels 8 and 10. These wheels are attached to the wheel supports 24 and 26, respectively, and are free to rotate about respective hubs. For example, wheel 8 is mounted to hub 16 and is free to rotate about a horizontal axis 12 (FIG. 3). This hub is attached to upright portion 20 of wheel support 24.

The wheel support further includes means for attaching pivotally to the vehicle frame. The support preferably has a generally flat, horizontal portion 21 attached pivotally to frame cross member 4 at inboard pivotal attachment 28 and outboard pivotal attachment 30. The attachments preferably comprise a bracket secured to the frame, and a bolt and nut received through apertures in the bracket and the associated portion of the wheel support. These two pivotal attachments are aligned to provide for pivoting about a horizontal axis extending therethrough. The pivotal attachments are also displaced laterally to enhance the lateral stability of the wheel support, and therefore of the first wheel 8.

A similar method is used to attach wheel 10 to frame cross member 6. Hub 18, about which second wheel 10 is free to rotate, is attached to upright portion 22 of wheel support 26. This wheel support further includes a horizontal portion 23 which is pivotally attached to frame cross member 6 at pivotal attachments 32 and 34. The wheel support 26 is thereby pivotal with respect to the frame about a horizontal axis extending through the pivotal attachments 32 and 34, and the wheel 10 is rotatable about an axis 14 (FIG. 3) which extends parallel to the pivoting axis.

Figure 2:
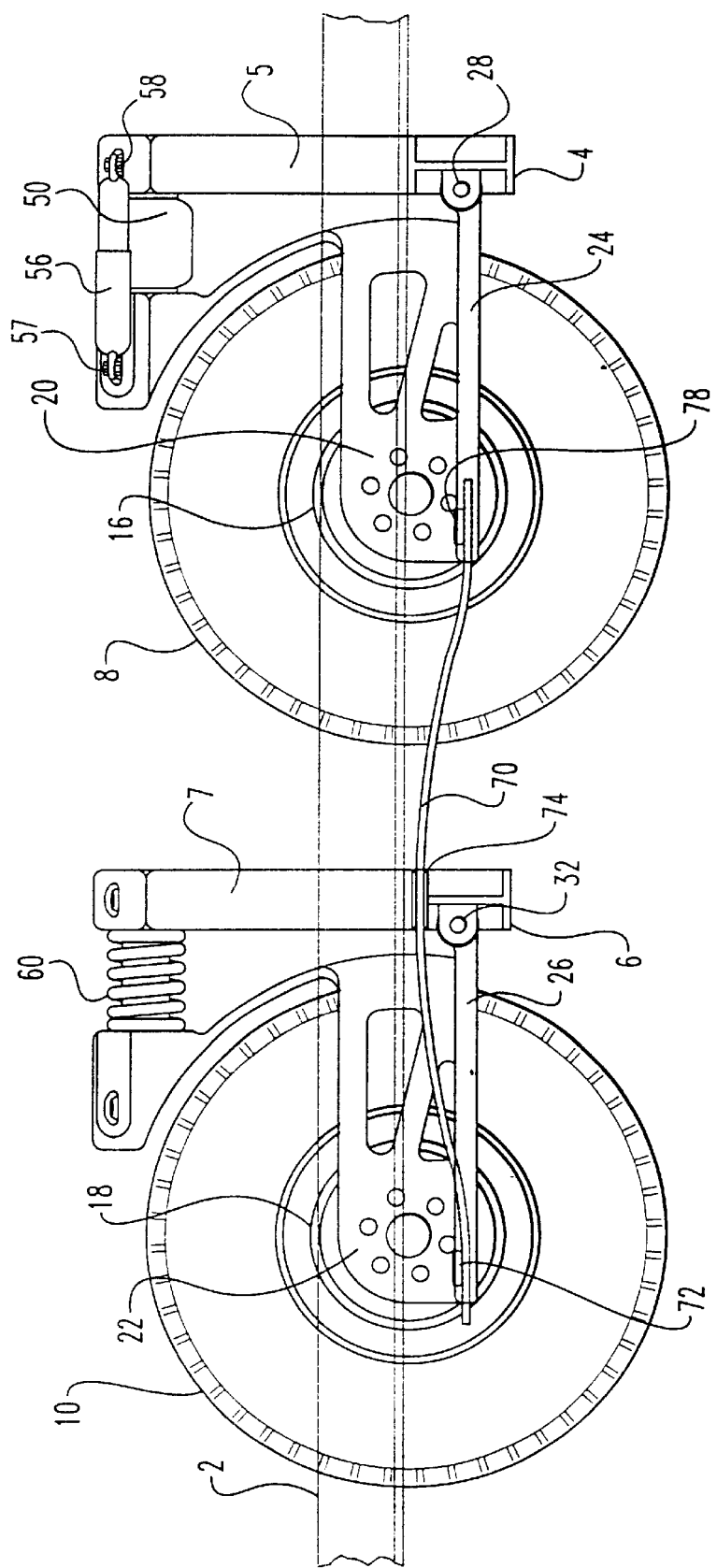
FIG. 2 is a side elevational view of the wheel assemblies and wheels of FIG. 1 mounted to a vehicle frame, viewing outwardly from inboard of the assemblies.

The upright portions of the wheel supports attach not only to the hubs, but also continue around the forward upper quadrant of the respective wheels and attach to spring and shock absorber assemblies. As shown in FIGS. 2 and 3, air spring (air bag) 50 and shock absorber 56 both connect support upright portion 20 to frame vertical member 5. Air spring 50 is attached at face 51 of first wheel support 24, and also at face 52 of first frame vertical member 5, in conventional fashion. Shock absorber 56 is mounted in a typical manner along side air spring 50, to first wheel support 24 at pivotal attachment 57, and to first frame vertical member 5 at pivotal attachment 58. As wheel support 24 rotates about pivots 28 and 30, the distance between upright portion 20 and vertical member 5 changes. The air bag and shock absorber accommodate this movement and cushion the pivoting of the wheel support.

An alternate to the spring and shock absorber arrangement utilizes a coil spring 60, as shown attached between wheel support 26 and frame vertical member 7 in conventional fashion. This spring attaches to front spring mount 62 of vertical member 7, and to rear spring mount 61 of wheel support 26. When utilizing a coil spring, the shock absorber could be attached alongside the spring, similar to the positioning shown for shock absorber 56, or it could be attached coaxially with the coil spring. Shock absorber 66 is shown mounted between frame vertical member 7 and wheel support 26 inside the coils of coil spring 60.

Additionally spring support for the wheel occurs in respect to the horizontal portions of the wheel support members. The horizontal portion is configured to be substantially flat and to underlie the vehicle frame. It is a feature of the present invention that such a compact wheel support is also supportable in a manner to further enhance the low profile of the overall suspension in comparison to the vehicle frame.

The wheel support engages a leaf spring 70 that is secured between the support and the vehicle frame. Each wheel support can be combined with an individual leaf spring. Alternatively, pairs of wheel supports can be accommodated by a single leaf spring, as shown in the drawings. In general, a wheel support includes a leaf spring receiving member for connection with an end of the leaf spring. Leaf spring 70 is shown having a forward portion received within a narrow slot comprising a leaf spring forward attachment 78. Leaf spring 70 continues in the aft direction, attaching to the frame by means of the frame attachment 74 through which it passes. Aft of that location the leaf spring includes a portion received within the rear attachment 72 defined by the wheel support 26.

Frame attachment 74 prevents lateral, longitudinal or vertical motion of the leaf spring at the point of attachment. However, pivoting is permitted about the lateral access established by frame attachment 74.

As wheel support 24 pivots about the axis defined by the attachments 28 and 30, forward attachment 78 of the wheel support moves in an arc relative to cross member 4. The distance between attachments 74 and 78 changes as the wheel support pivots. Attachment 78 permits sliding of leaf spring 70 in the fore and aft directions. Thus, a change in the fore/aft distance between attachments 74 and 78 does not result in the creation of spring load from spring 70. However, attachment 78 does resist any change in the vertical distance between attachments 78 and 74. Thus, rotation of the wheel support results in a change in spring load of spring 70 for the vertical component of movement.

Although the preferred embodiment depicts a single leaf spring attached near its center in providing support to wheel supports both in front and behind it, it is also possible to use a single leaf spring for each wheel support. For example, it would be possible to remove all portions of leaf spring 70 aft of attachment 74, and have the remainder support only first wheel support 24. Similarly, it would also be possible to remove all portions of leaf spring 70 forward of attachment 74, thus providing support only to second wheel support 26. Thus, leaf spring 70 could provide independent support for each wheel support, and the attachment of that independent leaf spring, could either be forward or aft of the respective wheel rotational axis.

Alternate embodiments of the present invention shown in FIGS. 4–18 also provide a wheel suspension system which has an extremely low profile. These alternate embodiments utilize a wheel support that is connected by a pair of pivotal attachments to the vehicle frame. The wheel support supports a wheel for rotation about a rotational axis. The rotational axis is located above the pivotal attachments and above the transverse frame structure which lowers the profile of the wheel support and permits additional cargo-carrying volume above the wheel support. The pivotal attachments are spaced apart laterally, thereby providing lateral support for the wheel. The wheel support is pivotal between a first, uppermost position and a second, lowermost position. The pivot axes of the two pivotal attachments are generally coincident, and are preferably arranged such that the wheel support pivots in a pitching direction relative to the vehicle.

Some of these embodiments incorporate a spring such as an airbag, leaf spring, or coil spring for biasing the wheel support to a position intermediate of the first and second positions. The spring is placed between a spring support of the vehicle frame and a spring support of the wheel support, and is placed beneath the rotational axis of the wheel and preferably inward of the wheel and tire. This placement of the spring helps increase useable cargo carrying volume for the vehicle and simplifies the structural support necessary to support the biasing loads by utilizing planar portions of the vehicle frame to support the spring. In addition, some embodiments orient the shock absorber in a generally horizontal position beneath the rotational axis of the wheel. This placement of the shock simplifies the structure of the wheel support and also the upright structures of the frame that houses the wheels. In some of those embodiments with horizontal shock absorbers placed below the wheel rotational axis, the biasing mechanism includes either an air bag, or one or more leaf springs coupled to both a wheel support and a cross member of the vehicle frame. In yet other embodiments, a leaf spring couples to adjacent wheel supports and to the vehicle frame.

Figure 4:
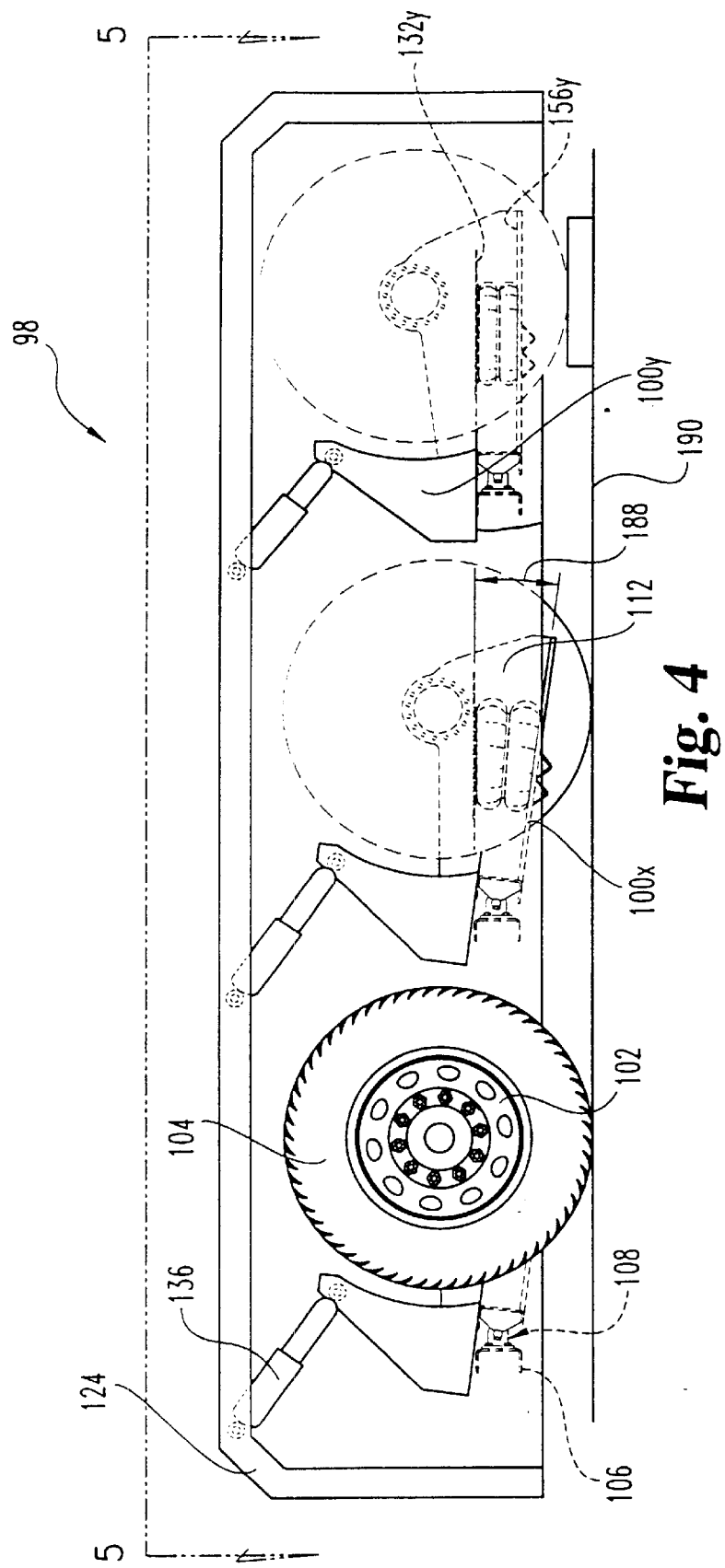
FIG. 4 is a side elevational view of a frame and suspension section of a vehicle according to another embodiment of the present invention.
Figure 5:
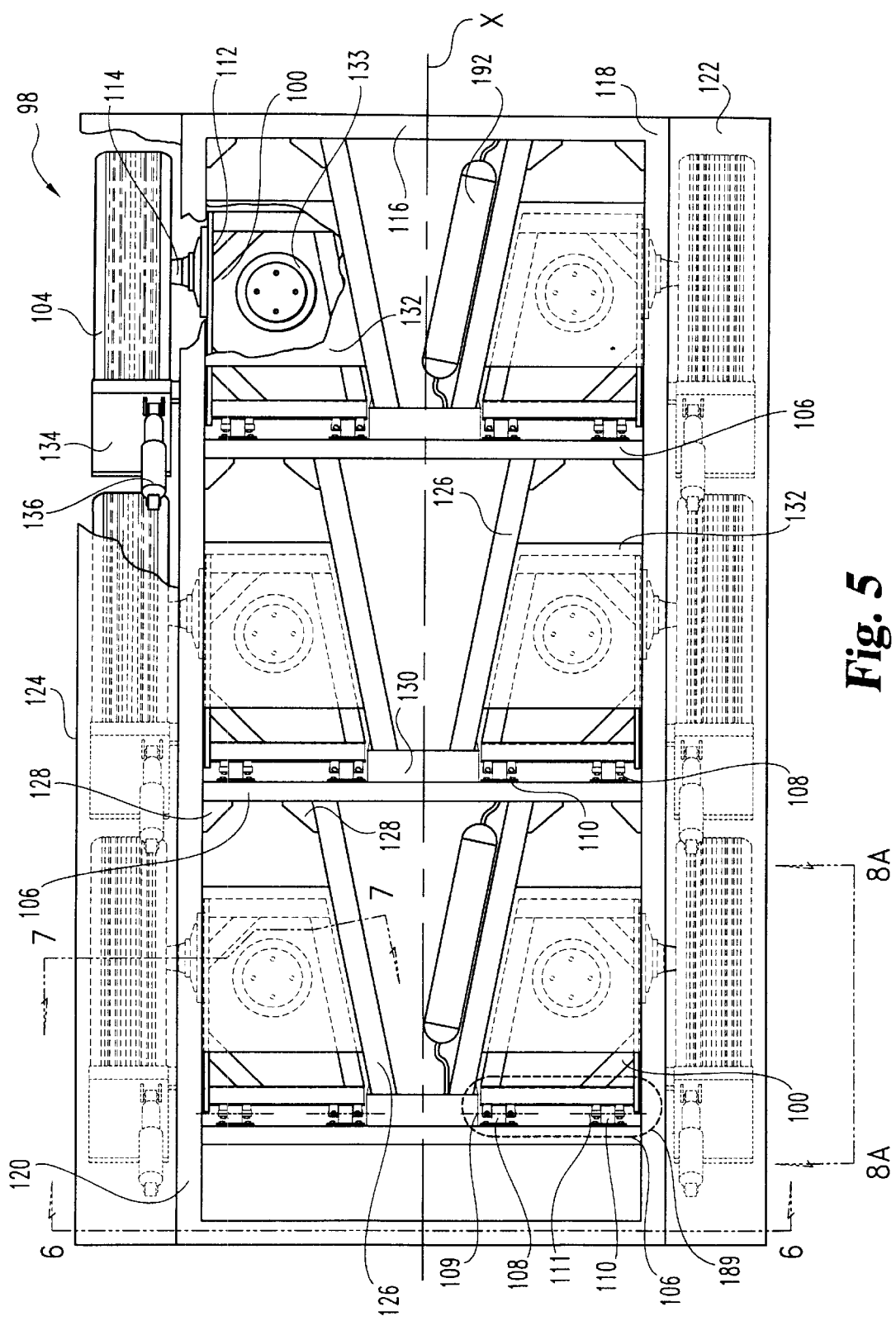
FIG. 5 is a top plan view of the vehicle section of FIG. 4 as taken along line 5—5 of FIG. 4.

Referring to FIGS. 4–6, a vehicle frame and suspension section 98 with a longitudinal axis X includes a wheel support 100 which rotatably supports a wheel 102 and tire 104. Wheel support 100 is pivotally attached to a cross member 106 of a transverse frame structure 116 by a first pivotal attachment 108 and a second pivotal attachment 110. Pivotal attachments 108 and 110 couple wheel support 100 to frame section 98, and are displaced laterally from one another so as to provide stability to wheel support 100. Pivotal attachments 108 and 110 are pivotal about first axis 109 and second axis 111, respectively. Pivotal axes 109 and 111 are preferably coincident with each other and are preferably oriented transverse to the direction of motion of the vehicle. Wheel support 100 is thus pivotally attached so as to permit pitching motion of wheel support 100. Wheel support 100 includes a generally upright portion 112 which supports a spindle, or stub axle, 114 about which wheel 102 rotates. The present invention contemplates spindles, hubs, stub axles, and other similar devices known to those of ordinary skill in the art as means for rotatably supporting a wheel on the wheel support.

Figure 6A:
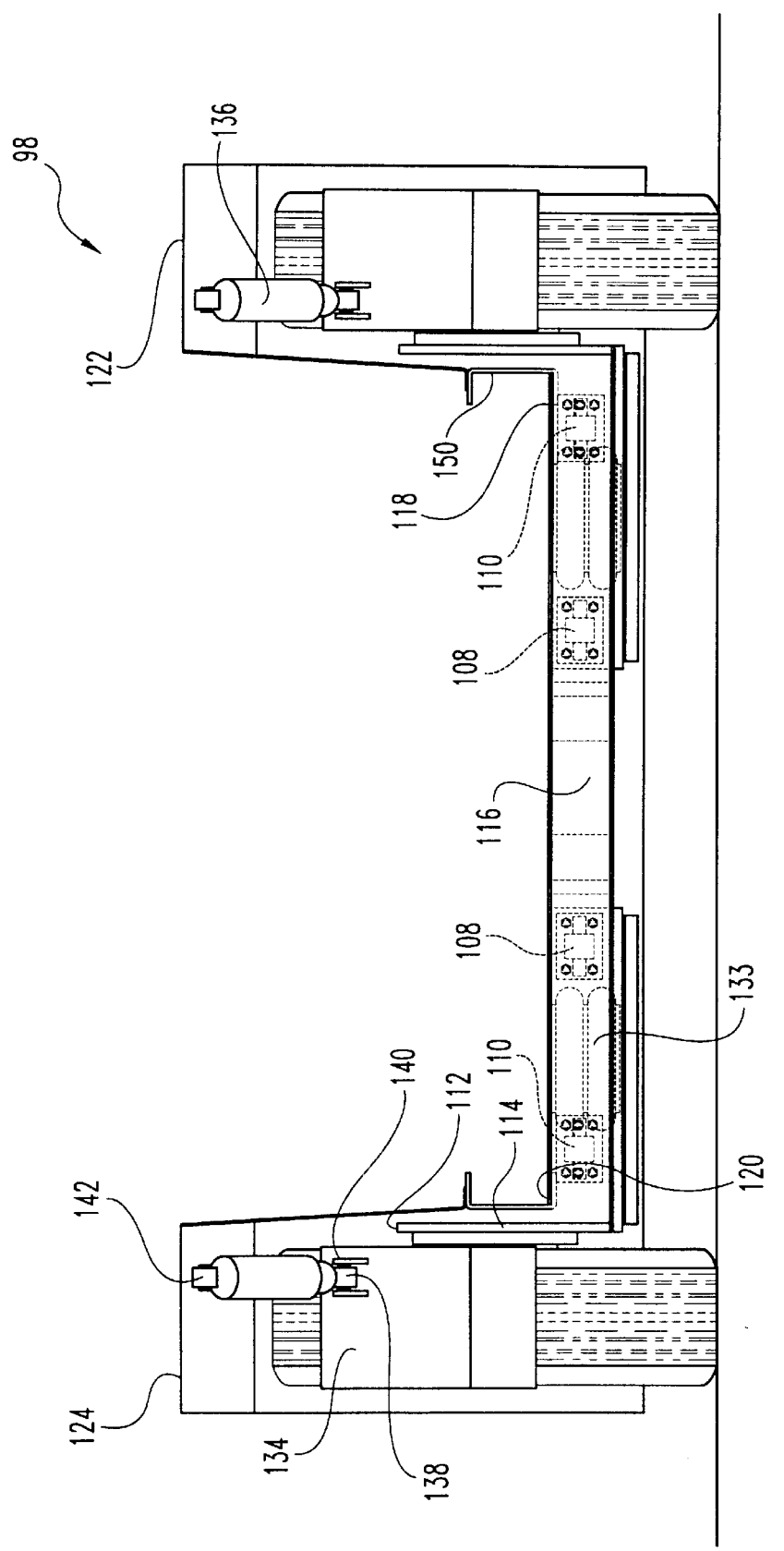
FIG. 6A is a cross-sectional view of the vehicle section of FIG. 5 as taken along line 6—6 of FIG.5.
Figure 12:
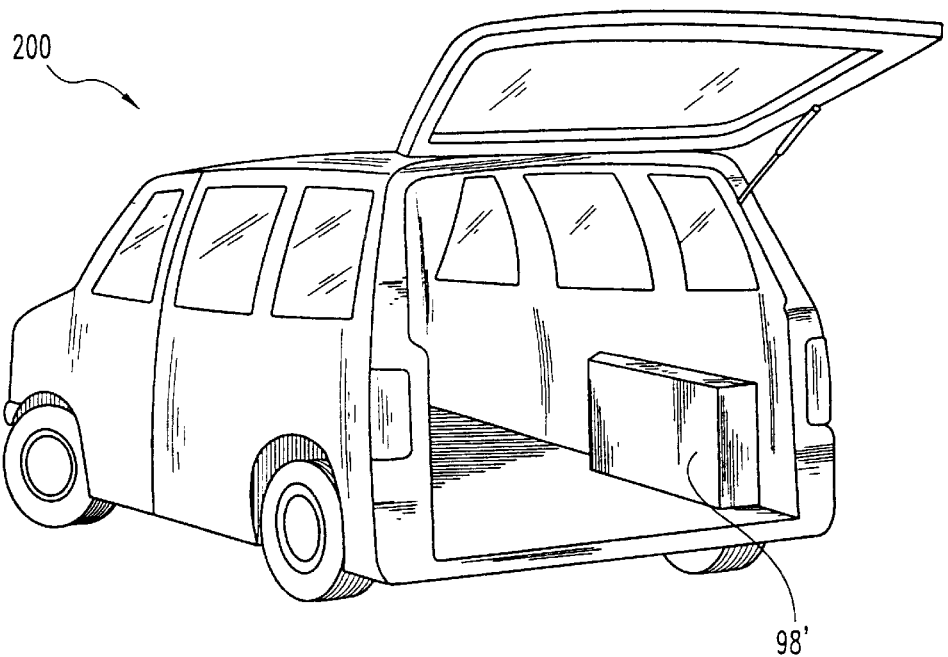
FIG. 12 is a perspective view of a two-wheeled embodiment of the present invention as used within a van.
Figure 13:
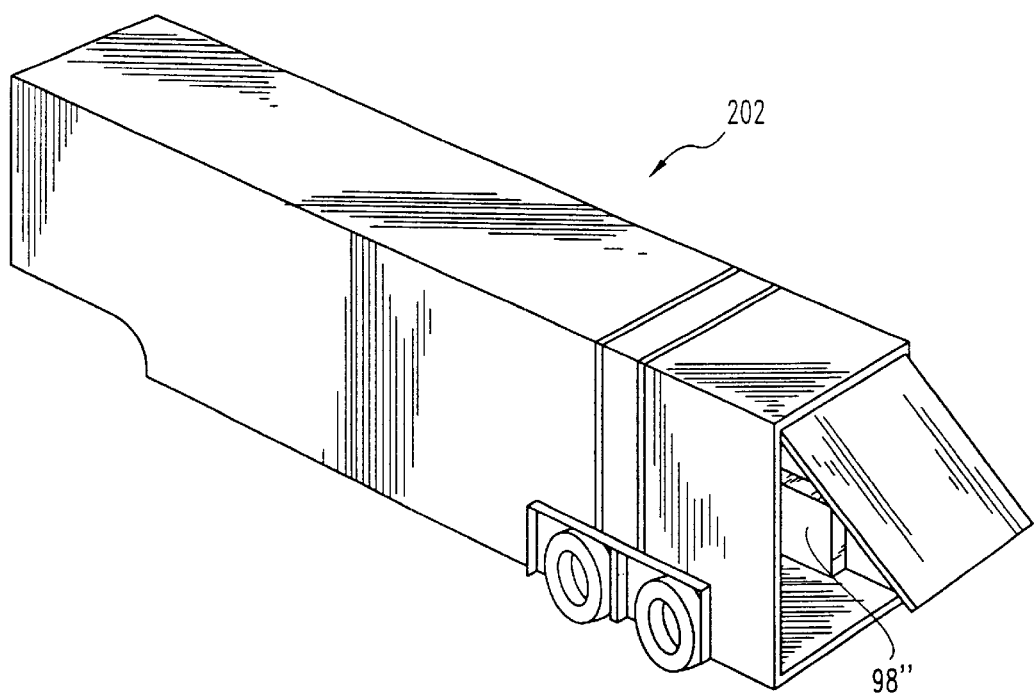
FIG. 13 is a perspective view of a four-wheeled embodiment of the present invention as used within a trailer.

Frame and suspension section 98 includes a row of tires 104 on either side of a transverse frame structure 116. Transverse frame structure 116 generally supports the vehicle cargo or utility section directly above it, as best seen in FIGS. 12 and 13. Referring again to FIGS. 5 and 6A, transverse frame structure 116 includes laterally disposed transverse frame sides 118 and 120. Attached to first transverse frame side 118 is a first upright frame structure 122. Attached to second transverse frame side 120 is a second upright frame structure 124. Frame structures 124, 116, and 122 form a generally U shape, as best seen in FIG. 6A, with transverse structure 116 being attached to the bottoms of the opposing upright frame structures 124 and 122. The top surface of transverse structure 116 preferably defines a plane that is located generally at or below the rotational axis of the wheels.

Wheels 102, shock absorbers 136, spindles 114, and upright portion 112 of wheel support 100 are disposed within upright structures 122 and 124. Spindle 114 supports one or more wheels 102 disposed within the upright frame structures. Spindle, or stub axle, 114 is not an axle that extends across transverse frame structure 116. By not having an axle spanning between upright frame structures 122 and 124, it is possible to have more cargo-carrying volume within the vehicle. Transverse frame structure 116 can thus be located below the rotational axes of the wheels 102, and cargo can be carried below the rotational axes also.

Transverse frame structure 116 preferably includes a cross member 106 for each pair of wheel supports 100. Cross members 106 are attached to longitudinal members 126 and sides 120 and 118 by corner reinforcements 128. In addition, longitudinal members 126 are also interconnected to members 106 preferably with reinforcements 130. Frame spring supports 132 of transverse frame structure 116 are generally planar portions in one embodiment which extend inward preferably from either first side 118 or second side 120 to longitudinal members 126. Preferably, spring supports 132 are laterally disposed inwardly from the wheel being supported. Portions of wheel supports 100 for supporting a spring are located below frame spring supports 132. Disposed between each wheel support 100 and frame spring support 132 in one embodiment is an air spring 133. Frame spring support 132 provides a support for air spring 133.

Although what has been shown and described is a specific arrangement of cross members and longitudinal members with reinforcements, the present invention also contemplates other arrangements for a transverse frame structure as would be known to one of ordinary skill in the art. Although welding is a preferable means of joining various members of frame and suspension section 98, the present invention also contemplates other joining and integrating methods, including fusion, bonding, brazing, bolting, casting, molding, and similar methods known in the art. Also, those of ordinary skill in the art will recognize that the cross members and longitudinal members can have a variety of cross sectional shapes, such as for C channels, I beams, L shapes, rectangular shapes, and others.

Wheel support 100 is pivotally attached to cross member 106 by a pair of pivotal supports 108 and 110. Supports 108 and 110 permit pivoting of wheel support 100 in a pitching direction about a pivotal axis that coincides with first axis 109 of support 108 and second axis 111 of support 110. Inboard pivotal attachment member 180 of support 100 is preferable releasably fastened to inner pivot 108a of support 108. Inner pivot 108a is coupled to outer support housing 108c through a rubber bushing 108b. Inner pivot 108a is able to pivot relative to housing 108c by twisting rubber bushings 108b. In a similar fashion, an inner pivot 110a of pivotal attachment member 110 is able to pivot relative to the housing 110c by twisting a rubber bushing 110b.

Figure 8A:
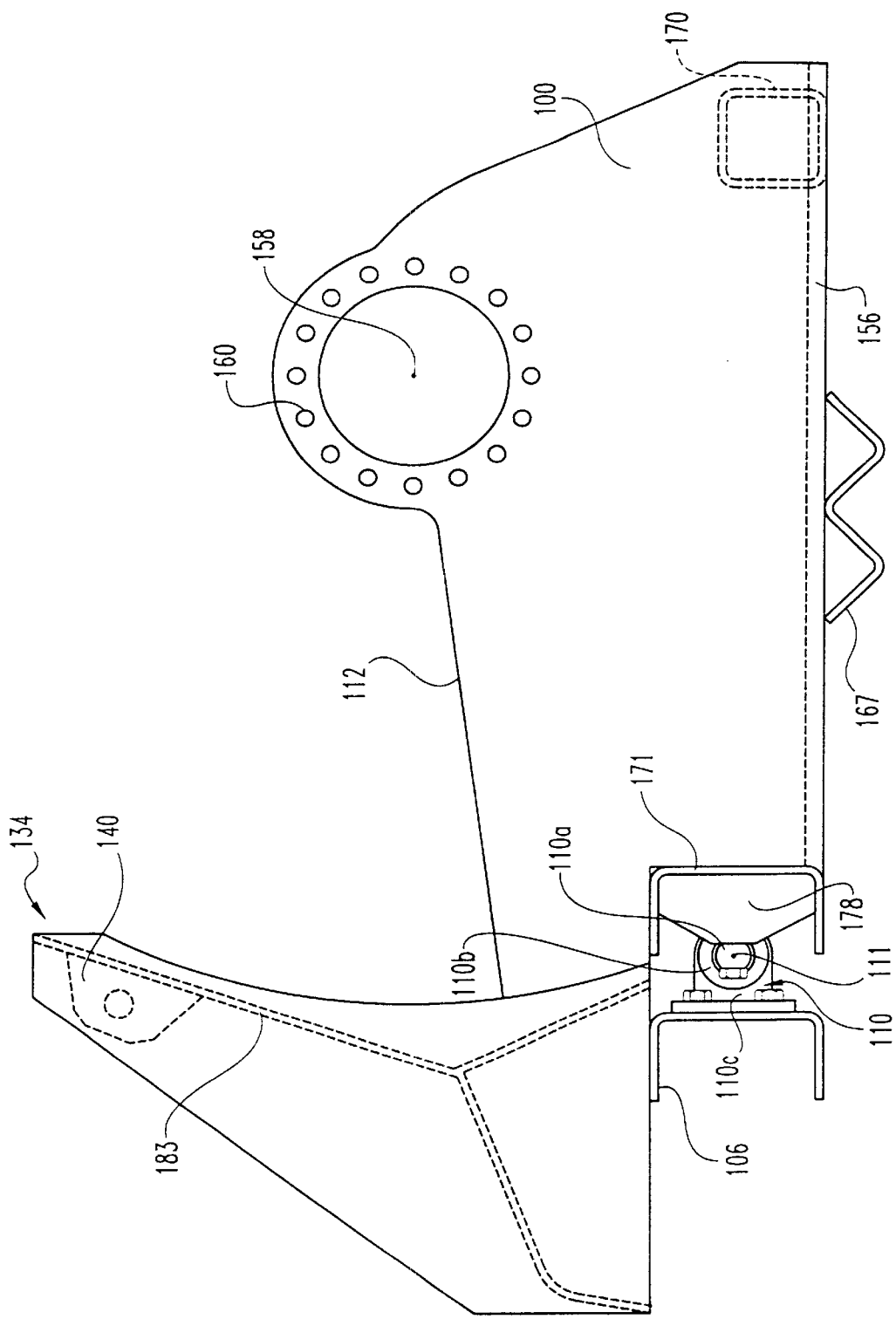
FIG. 8A is a side elevational view of a wheel support and a portion of the vehicle section of FIG. 5 as viewed along line 8A—8A of FIG. 5.

Wheel support 100 supports a wheel for rotation about a rotational axis 158, and is arranged and constructed such that there is usable cargo volume below the rotational axis of the wheel, as best seen in FIGS. 6A, 12, and 13. Horizontal portion 168 of wheel support 100 lies generally below the volume useful for cargo. Pivotal attachments 108 and 110, which pivotally support wheel support 100, have pivot axes 109 and 111, respectively, that are located below rotational axis 158. In one embodiment of the present invention, pivot axes 109 and 111 are preferably parallel to rotational axis 158, as best seen in FIG. 8A.

Wheel support 100 pivots about pivot axis 109 and 111 in a pitching direction relative to the vehicle, and is pivotal between an uppermost position and a lowermost position. Wheel support 100 is biased to a position between the uppermost and lowermost positions, preferably by air spring 133. However, the present invention also contemplates the use of other means for biasing the wheel support, including by way of example one or more coil springs or one or more leaf springs. The one or more springs bias wheel support 100 to a position between the uppermost and lowermost positions by urging spring support 156 of wheel support 100 apart from frame spring support 132 of the vehicle frame.

In one embodiment, spring supports 156 and 132 generally face each other and are part of a structural load path for the spring forces from spring 133. Preferably, spring supports 156 and 132 are disposed laterally inward from the wheel being supported, although the present invention also contemplates spring supports disposed laterally inward from the tire being supported. Spring supports 156 and 132 are preferably generally planar in those embodiments utilizing air springs with planar attachment surfaces. However, the present invention also contemplates those embodiments in which spring supports 156 and 132 are constructed and arranged to compatibly support other types springs, including, for example, leaf springs and coil springs.

Figure 7:
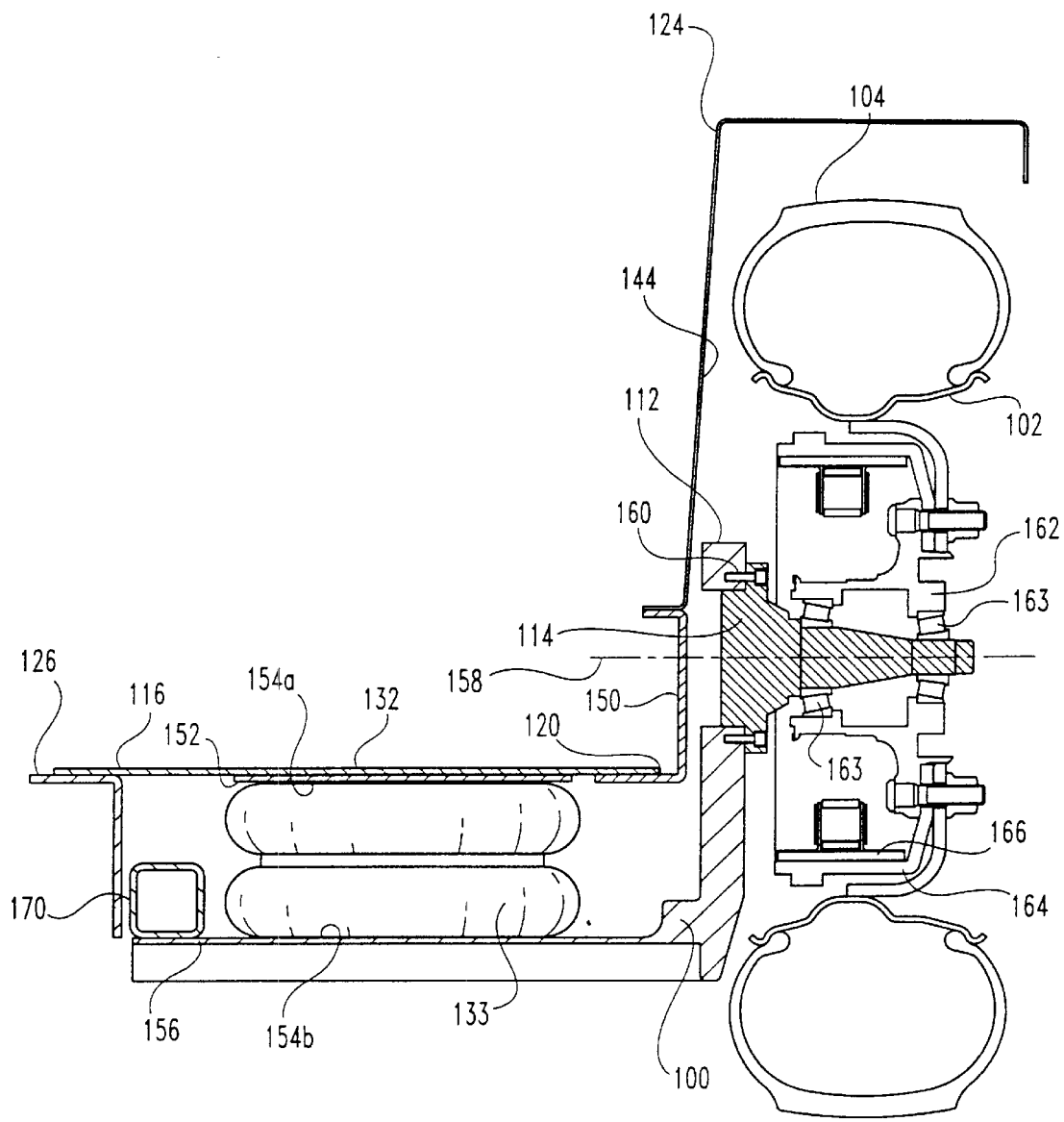
FIG. 7 is a partial cross-sectional view of a portion of the vehicle section of FIG. 5 as taken along the line 7—7 of FIG. 5.

Referring to FIG. 7, upright frame 124 is joined to transverse frame structure 116 along second side 120 of frame structure 116. In one embodiment, vertical wall section 144 of upright structure 124 is angled outwardly about 4 degrees from the vertical, so as to permit additional cargo space. Wall section 144 is preferably fused to a longitudinal member 150 in the shape of a C channel that extends along side 120.

Air spring 133 is preferably fastened to attachment plate 152 by fasteners (not shown) along upper contact face 154a of air spring 133, contact face 154a being one end of air spring 133. Attachment plate 152 is preferably fastened to spring support 132 of frame section 116 by fasteners (not shown). One side of spring support 132 is preferably welded to a longitudinal member at 126, and the other side of spring support 132 is preferably welded to longitudinal member 150, the present invention contemplating other means known to those of ordinary skill in the art for coupling the spring support to the transverse fame section.

Air spring 133 is preferably fastened by fasteners (not shown) to spring support 156 of wheel support 100 along a lower contact face 154b of air spring 133, contact face 154b being the other end of air spring 133, this end of air spring 133 being between the second spring support 156 and the rotational axis of the wheel. Thus, upper contact face 154a is coupled to and in contact with a first spring support 132 and lower contact face 154b is coupled to and in contact with a second spring support 156.

Although it is preferable to couple lower face 154b of the air spring with fasteners to attachment member at 156, coupling is not necessary provided lower face 154b is in contact with spring support 156. Attachment members 156 and 132 support biasing loads from spring 133.

Upright portion 112 of wheel support 100 supports spindle 114. Spindle 114 is attached at a fastener attachment pattern 160 to upright portion 112. Spindle 114 defines a rotational axis 158 that is generally horizontal and preferably parallel to the pivotal axis of wheel support 100. However, the present invention also contemplates those embodiments in which the rotational axis of the wheel and the pivotal axis of the wheel support are not parallel. A hub 162 is mounted to spindle 114 by a pair of bearings 163. A brake drum 164 is fastened to hub 162, and provides a braking surface for a pair of brake shoes 166.

Figure 8B:
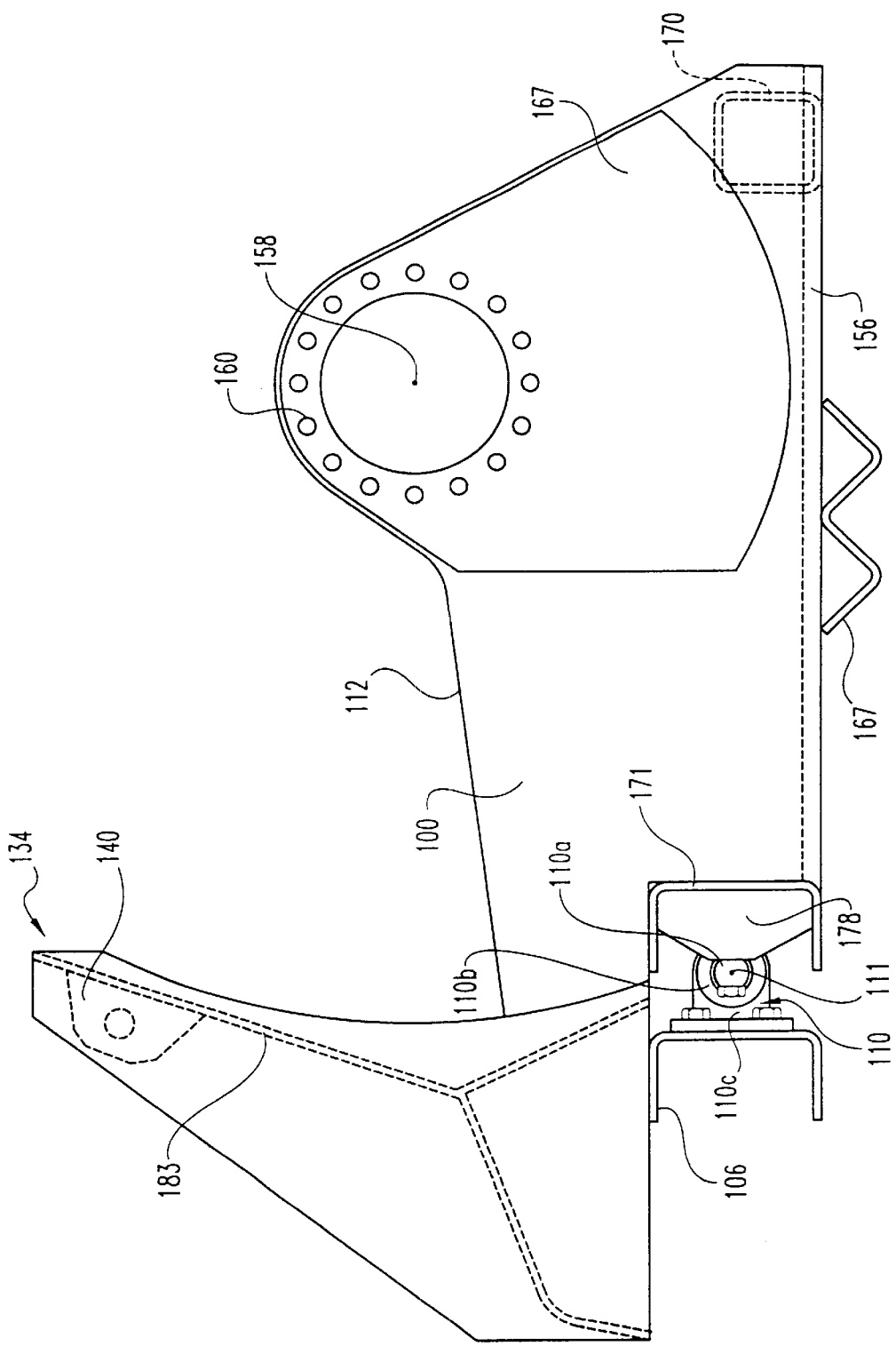
FIG. 8B is a side elevational view of the wheel support and portion of the vehicle section of FIG. 8A including a reinforcing doubler.

Upright portion 112 of wheel support 100 in one embodiment includes a support structure 134. A shock absorber 136 is pivotally coupled to support structure 134 by a coupling end 138 that attaches to ears 140 of support structure 134. Attachment ears 140 for coupling to shock absorbers 136 are attached to support plate structure 183 of support structure 134 as best seen in FIGS. 8A and 8B. As seen in FIGS. 6A–7, the other coupling end 142 of shock absorber 136 is pivotally coupled within upright frame structures 124 and 122. Shock absorber 136 and support structure 134 are located forward of the rotational axis of wheel 102, and above the pivot axis of wheel support 100 in some embodiments.

Figure 9:
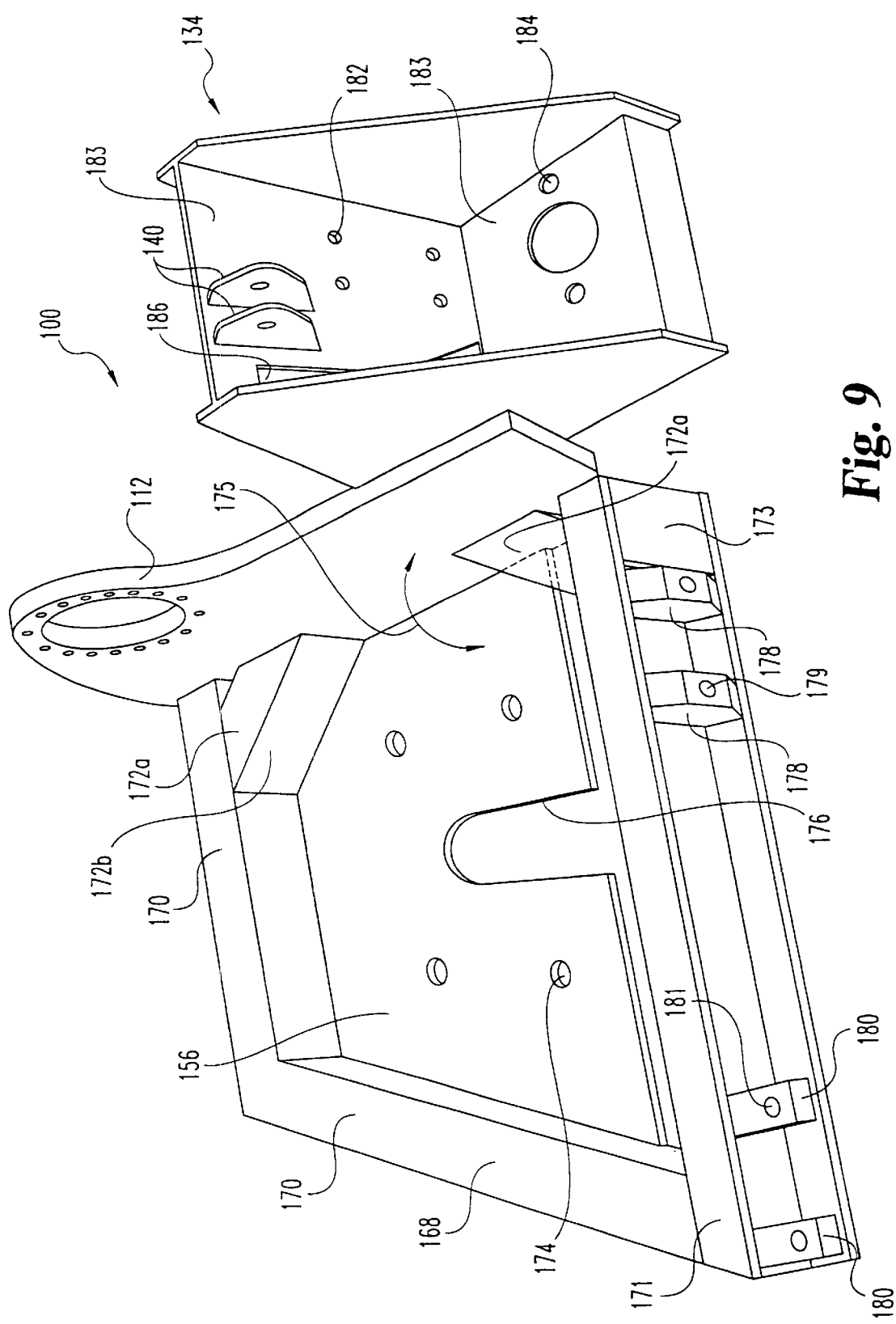
FIG. 9 is a perspective view of a wheel support according to one embodiment of the present invention.

Support structure 134 preferably provides features for attachment of various components, including braking system components (not shown). As best seen in FIG. 9, support 134 includes support plates 183 which incorporate fastening patterns 182 and 184 for support and attachment of various components, including braking system components (not shown). Top support plate 183 also defines a slot 186 through which brake system linkages (not shown) pass onto the braking system components for wheel 102.

Referring to FIG. 8A, a side elevational view of wheel support 100 and a portion of frame 116 is shown. Some embodiments of wheel support 100 include a stiffening member 167 generally in the shape of a "W" to provide stiffness and strength along spring support 156 and to better distribute loads from air spring 133 into wheel support 100. However, the present invention also contemplates those wheel supports 100 in which alternative structure is used to provide sufficient support for spring biasing loads imposed upon spring support 156, including by way of example only, increased thickness for spring support 156, stiffening ribs attached or incorporated into spring support 156, V-shaped and I-shaped structural members, and various other equivalents known to those of ordinary skill in the art.

FIG. 8B depicts a side elevational view of an embodiment of wheel support 100 capable of supporting two wheels. A doubler plate 167 is installed on upright section 112 between section 112 and wheel spindle 114. Doubler plate 167 provides an improved distribution of load from spindle 114 within upright section 112. In one embodiment of the present invention, upright section 112 is constructed from A-36 steel plate of about one and one quarter inch thickness. Doubler plate 167 is constructed from A-36 steel plate of approximately one half inch thickness. In other embodiments the doubler may not be needed, upright portion 112 being fabricated from thicker material or higher strength material, incorporating reinforcing ribs, or otherwise suitably strengthened.

FIG. 9 is a perspective view of a wheel support according to one embodiment of the present invention. Wheel support 100 includes a generally horizontal portion 168 attached to upright portion 112. Horizontal portion 168 includes spring support 156 for supporting air spring 133. In one embodiment, spring support 156 includes a fastener pattern 174 for fastening air spring 133 to wheel support 100. However, in some embodiments of the present invention spring support 156 is not fastened to air spring 133. Horizontal portion 168 also preferably includes a slot 176 or other means to provide clearance for an air line for pressurizing and depressurizing air spring 133. In some embodiments, the center of air spring 133 is located between the rotational axis of the wheel and the pivotal axis of the wheel support, as best seen in FIG. 4.

Referring again to FIG. 9, a reinforcing member 170, which may include one or more distinct pieces, has a generally square cross-section in one embodiment and supports some of the edges of spring support 156. A reinforcing member 171 with a C-shaped cross-section is attached to one end of reinforcement member 170 and also to upright portion 112. Reinforcement member 171 includes a pair of inboard pivotal attachment members 180 and a pair of outboard pivotal attachment members 178. Inboard attachment members 180 define holes 181 for coupling to second pivotal attachment 108. Outboard pivotal attachment members 178 preferably define threaded holes 179 for fastening to first pivotal attachment 110. In one embodiment, holes 179 are oriented about ninety degrees from holes 181.

Multiple corner reinforcements 172*a* and 172*b* attach reinforcement member 170 to upright portion 112 in one corner. A corner reinforcement 172*a* similarly attaches member 171 to upright portion 112. A reinforcement plate 173 is fused to one end of reinforcement member 171 near upright portion 112 so as to better distribute stresses within support 100. Plate member 173 and corner reinforcement 172*a* enhance the stiffness and strength of the load path from spindle 114 to outboard pivotal attachment members 180. In one embodiment of the present invention, the included angle 175 from upright section 112 to spring support 156 is about ninety and three fourths degrees, so as to provide about three fourths of a degree of positive camber when not loaded by the weight of the vehicle. Although a specific arrangement of reinforcement members has been shown and described for wheel support 100, those of ordinary skill in the art will recognize equivalent methods of providing sufficient strength and stiffness.

Figure 10A:
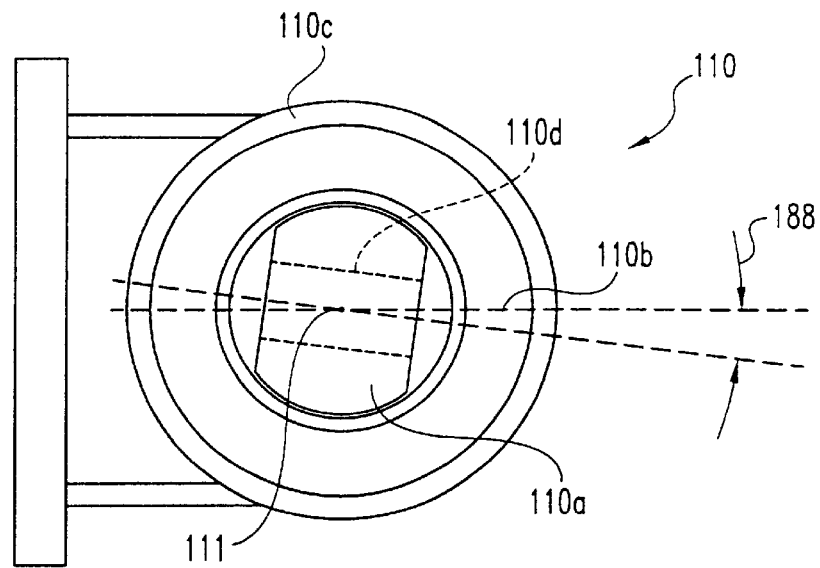
FIG. 10A is a side elevational view of a pivotal attachment according to one embodiment of the present invention.
Figure 10B:
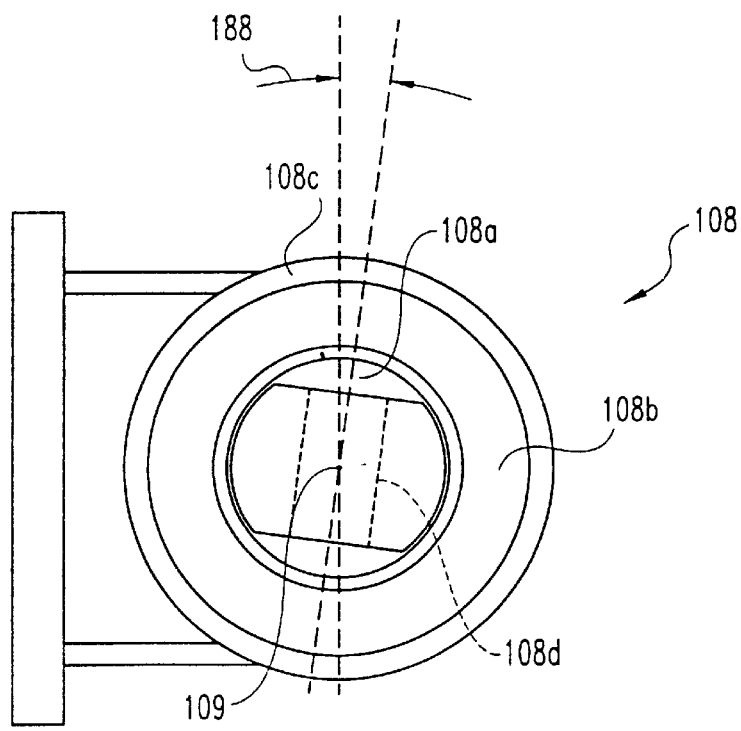
FIG. 10B is a side elevational view of another pivotal attachment according to one embodiment of the present invention.

FIGS. 10A and 10B depict side elevational views of pivotal attachments according to one embodiment of the present invention. Pivotal attachments 108 and 110 include pivotal inner support member 108*a* and 110*a*, respectively, that are supported from stationary outer members 108*c* and 110*c*, respectively, by elastomeric bushings 108*b* and 110*b*, respectively. Inner supports 108*a* and 110*a* are able to pivot about pivot axes 109 and 111, respectively. Inner pivotal member 108*a* includes a pair of through holes 108*d* for coupling attachment assembly 108 by fasteners to attachment members 180 of wheel support 100. In one embodiment fastener holes 108*d* are oriented such that their centerlines are inclined from the horizontal as indicated by angle 188. Fastener holes 110*d* of pivotal inner member 110*a*, likewise used for fastening pivotal attachment 110 to attachment members 178 of support 100, are inclined from vertical in one embodiment as indicated by angle 188. In one embodiment of the present invention angle 188 is about seven and one half degrees, and may be as large as about fifteen degrees. The offset angle 188 of the pivotal attachments preferably corresponds to a similar offset angle for wheel support 100 prime, as seen in FIG. 4, as will be discussed later. In other embodiments, angle 188 is about zero degrees.

Although what has been shown and described are pivotal attachment assemblies in which an inner pivoting member is elastomericly mounted to an outer housing, the present invention contemplates other type of pivotal attachment assemblies. By way of example only, the present invention also contemplates pivotal attachment assemblies in which a pivotal inner member is coupled by a bearing, such as a ball bearing or plane bearing, to an outer casing. By further way of example, the outer casing may be a cast, molded, adhered, welded, or otherwise fixedly attached member to the transverse frame section 116. By further way of example, the inner pivoting member may be cast, molded, adhered, welded, or otherwise fixedly attached or otherwise made integral with wheel support 100, thus eliminating the need for attachment members such as members 180 and 178. Yet other varieties of pivotal attachments are known to those of ordinary skill on the art. It is preferable that the pivotal attachments include a feature that permits spacing apart of the pivotal attachment from either frame section 116 or wheel support 110 so as to permit adjustment of wheel camber and toe-in. One embodiment of the present invention which includes such adjustment features will now be described.

Figure 11:
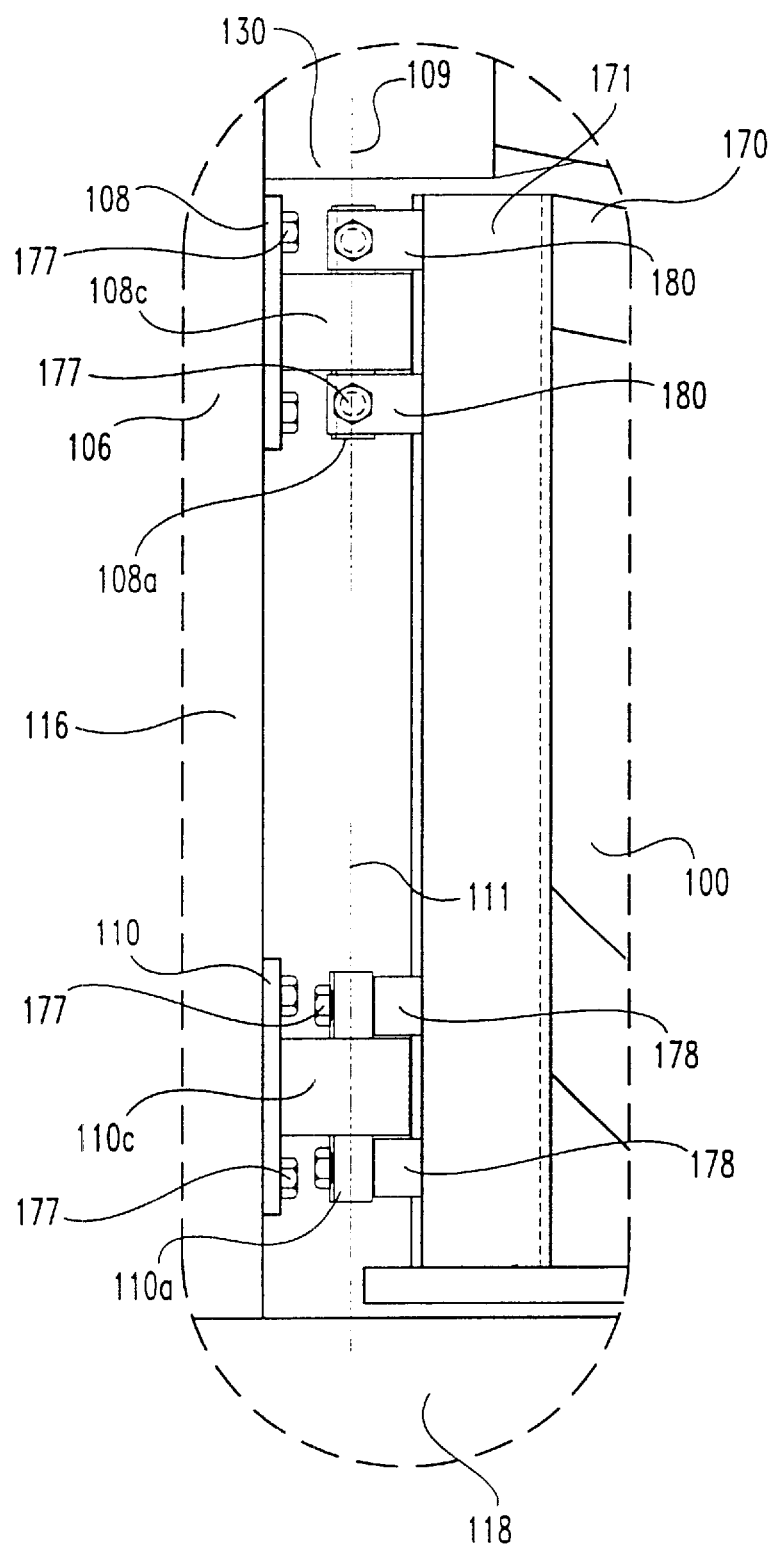
FIG. 11 is an enlargement of the area within dotted oval 189 of FIG. 5.

Pivotal attachments 108 and 110 are preferably attached by readily removable fasteners 177 to cross member 106, as seen in FIG. 11. Pivotal attachment 110 supports the outboard side of wheel support 100 via outboard pivotal attachment members 178. Pivotal attachment 108 supports the inboard side of wheel support 100 through L-shaped inboard pivotal attachment members 180. Pivotal attachment members 178 and 180 are preferably welded or otherwise attached, cast, or molded within channel member 171 of wheel support 100, as best seen in FIGS. 8A and 9.

Referring again to FIG. 11, pivotal attachment 110 is capable of being spaced apart from cross member 106 of frame 116 so as to move pivot axis 111 in a longitudinal direction relative to the vehicle. This spacing may be accomplished, for example, by insertion of a shim between pivotal attachment 110 and cross member 106. In addition, wheel support 100 may be spaced apart from pivotal attachment 110 by insertion of shims between attachment members 180 and pivotal inner member 110*a*. By spacing apart attachment assembly 110 from frame 116, and/or spacing apart wheel support 100 from attachment assembly 110*a*, the toe-in of the supported wheel 102 can be adjusted.

Second pivotal attachment 108 is similarly coupled to cross member 106 of frame 116, and may be spaced apart from frame 116 so as to move pivot axis 109 longitudinally relative to the vehicle. Thus spacing apart pivotal attachment 108 from frame 116 adjusts the toe-in of the wheel 102 supported by support 100. In one embodiment the present invention contemplates the use of shims for adjusting both camber and toe-in, including shims fabricated from sheet or plate material, and also shims in which the shim faces are not parallel, but are angled in proportion to the desired toe-in or camber angle. Further, the pivotal attachments are releaseably coupled to the transverse frame section and also to the wheel support so that the shimming may be performed easily and repeatedly, as desired, without the need, for example, to remove welded attachments.

Fastener attachment holes 108*d* are positioned about ninety degrees relative to fastener holes 110*d*. Also, fastener holes 181 of inboard attachment members 180 are oriented about ninety degrees relative to fastener holes 179 of outboard attachment members 178, as best seen in FIG. 9. As a result, spacing apart inner pivotal member 108*a* from attachment members 180 moves wheel support 100 in a different direction than that achieved by shimming between inner member 110*a* and attachment members 178. Spacing apart inner pivot 108*a* from attachment members 180 adjusts the camber of the wheel 102 supported by wheel support 100.

Although what has been described is an embodiment which includes a pivotal attachment 108 which can be shimmed or otherwise manipulated so as to adjust camber or toe-in and another pivotal attachment 110 which can be manipulated to adjust toe-in, the present invention also contemplates those embodiments in which there are two pivotal attachments each permitting adjustment of camber or toe-in or two pivotal attachments each permitting adjustment of only camber or toe-in. Further the present invention also contemplates embodiments in which neither pivotal attachment permits adjustment of either camber or toe-in, or in which only one pivotal attachment permits adjustment of either camber or toe-in.

In one embodiment of the present invention, spring support 156 of wheel support 100 is preferably inclined from the horizontal for improved airbag characteristics, as indicated by angle 188 of FIG. 4. Wheel support 100*x* is shown in the inclined position during operation of frame and suspension section 98 on a level surface. The tire rotatably supported from wheel support 100*y* is shown at full jounce over an irregularity in the roadway such that wheel support 100*y* has pitched up and second spring support 156*y* is generally parallel to first spring support 132*y* and also to roadway 190.

In this embodiment pivotal attachments 108 and 110 include inner pivoting members 108*a* and 110*a*, respectively, which have an included angle 188, as best seen in FIGS. 10A and 110B. By incorporating an offset angle 188 into pivotal attachments 108 and 110 that is the same as the offset angle 188 of wheel support 100 prime, stress within elastomeric bushing 108*b* and 110*b* is kept to a minimum during normal operation. Other embodiments of pivotal attachments incorporating by way of example plane, roller, or ball bearings in place of the elastomeric bushings would not need an offset angle 188. The present invention also contemplates pivotal attachments 110 and 108 in which the offset angle of the pivotal attachments is different than the offset angle of the wheel support relative to the roadway during normal operation, with the difference in the pivotal attachment offset angle and the wheel support offset angle being provided by angled attachment faces to attachment members 180 and 178.

One embodiment of the present invention contemplates an angle 188 of about 7.5 degrees between first spring support 132 and second spring support 156 during typical operation of the suspension system on a level roadway 190. Having an included angle 188 of about 7.5 degrees provides an acceptable range of air spring characteristics and internal air pressure in one embodiment, and permits placement of certain types of air springs below the cargo compartment of the vehicle. However, the present invention contemplates a range for angle 188 from about 0 degrees to about 15 degrees. For example, a cast wheel support with different dimensions provides equally acceptable air spring characteristics and internal pressure with an angle 188 of about zero degrees, such that faces 154*a* and 154*b* of air spring 133 are generally parallel during operation of the suspension on a level road.

In another embodiment of the present invention, there is a suspension control system for maintaining the ride height of the vehicle as the weight of the vehicle changes, and also for changing the air pressure in the air spring in response to pivoting of the wheel support. A linkage (not shown) attached to both wheel support 100 and the upright frame structure provides a control input to a pneumatic valve (not shown), such as a Neway Model 9005–4007 leveling valve. In response to movement of the linkage, the valve places air spring 133 in fluid communication with either ambient air or with a source of air pressure such as air tank 192, which is provided pressurized air from an air compressor. Movement of wheel support 100 relative to the vehicle frame causes the valve to increase or decrease the air pressure in air spring 133. The control system adjusts the air pressure within air spring 133 so as to maintain the wheel support at a predetermined angle relative to the vehicle frame, and also to maintain a predetermined orientation of the vehicle.

Although FIGS. 4, 5 and 6A depict an embodiment of the present invention which includes six wheel supports 100 supporting six wheels 102, some embodiments of the present invention include a single wheel support 100 supporting a single wheel 102. Other embodiments of the present invention, such as frame and suspension section 98' shown as part of a van vehicle 200 in FIG. 12, include two wheel supports 100 each supporting a single wheel 102. In yet another embodiment of the present invention shown in FIG. 13, a frame and suspension section 98" including four wheel supports 100 supporting four wheels 102 is shown in a trailer section of a vehicle 202. Further, some other embodiments of the present invention include a wheel support 100 that support a pair of wheels 102 to maintain adequate load margin in the tires when supporting a heavy cargo load.

Figure 6B:
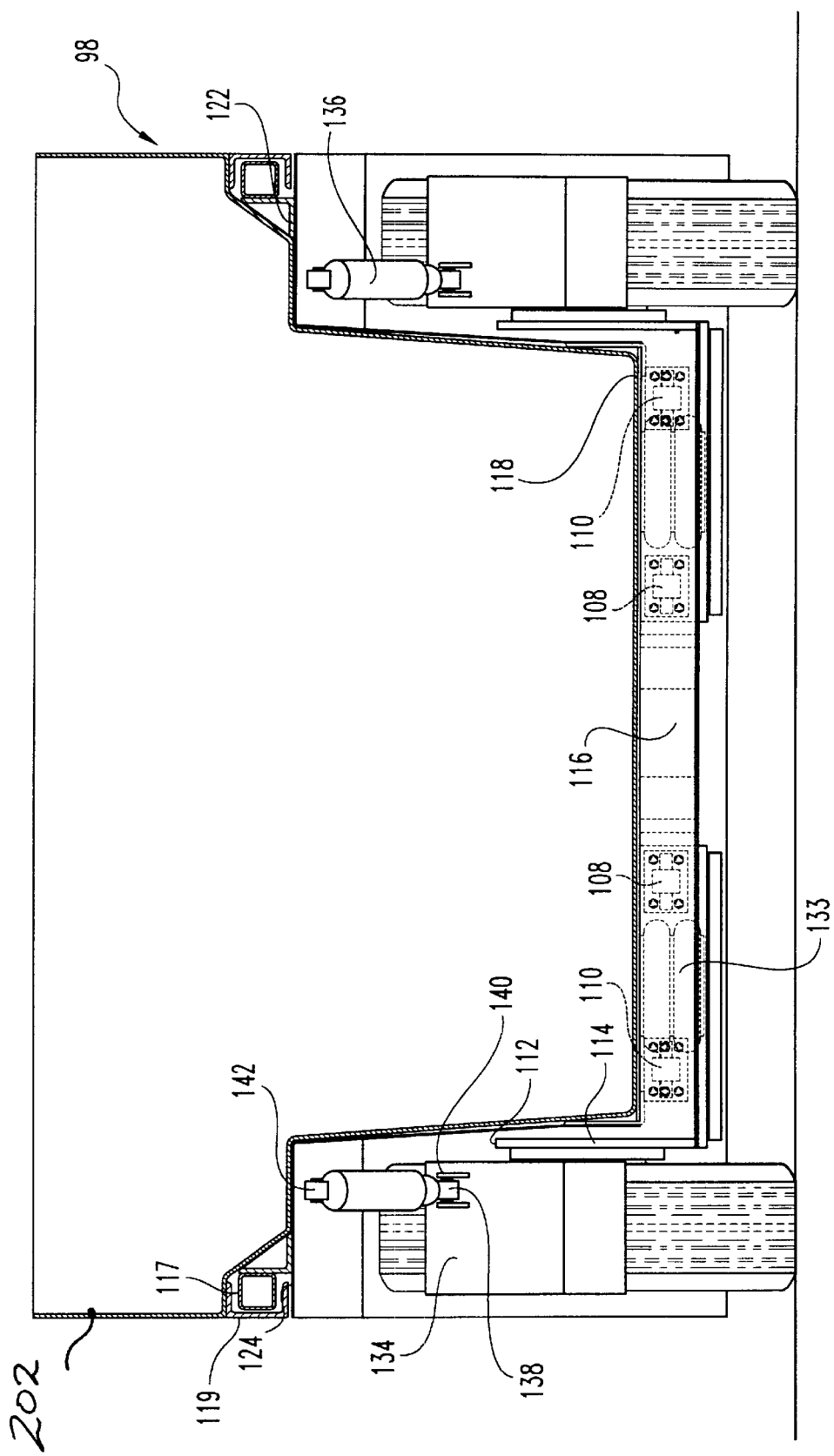
FIG. 6B shows the vehicle section of FIG. 6A supporting a cargo compartment.

The frame and suspension sections shown herein may be built modularly and slidingly coupled to a cargo compartment. As shown in FIG. 6B, some embodiments of frame and suspension section 98 include a pair of rails 117 coupled to upright frame structures 122 and 124. These rails 117 slidingly engage a pair of receiving C-channels 119 arranged on the underside of the trailer section of vehicle 202. After the sliding insertion, the floor of the trailer section is below the rotational axes of the wheels, the C-channel of longitudinal member 150 being replaced with an L-angle longitudinal member. The coupling of rails 117 and C-channels 119 limits lateral and vertical motion of the frame and suspension section relative to the cargo compartment. A locking arrangement (not shown) such as a plurality of locking shear pins inserted through matched holes limits fore and aft relative movement. Although a particular arrangement has been shown for coupling a frame and suspension section of the present invention to a trailer, those of ordinary skill in the art will recognize other arrangements, including those in which the frame and suspension section and trailer are not slidingly coupled.

Figure 14:
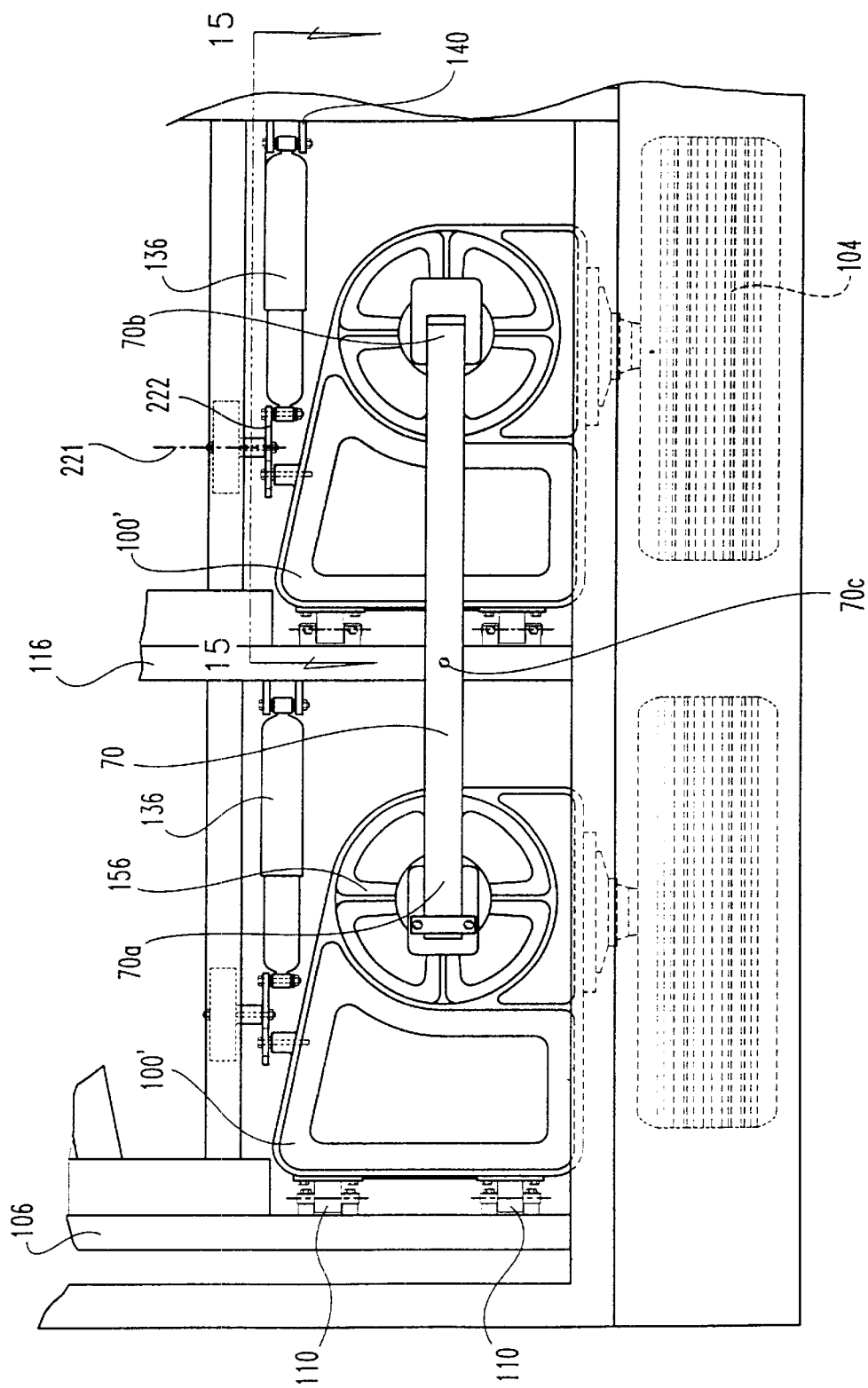
FIG. 14 is a top plan view of a vehicle section in accordance with another embodiment of the present invention.
Figure 15:
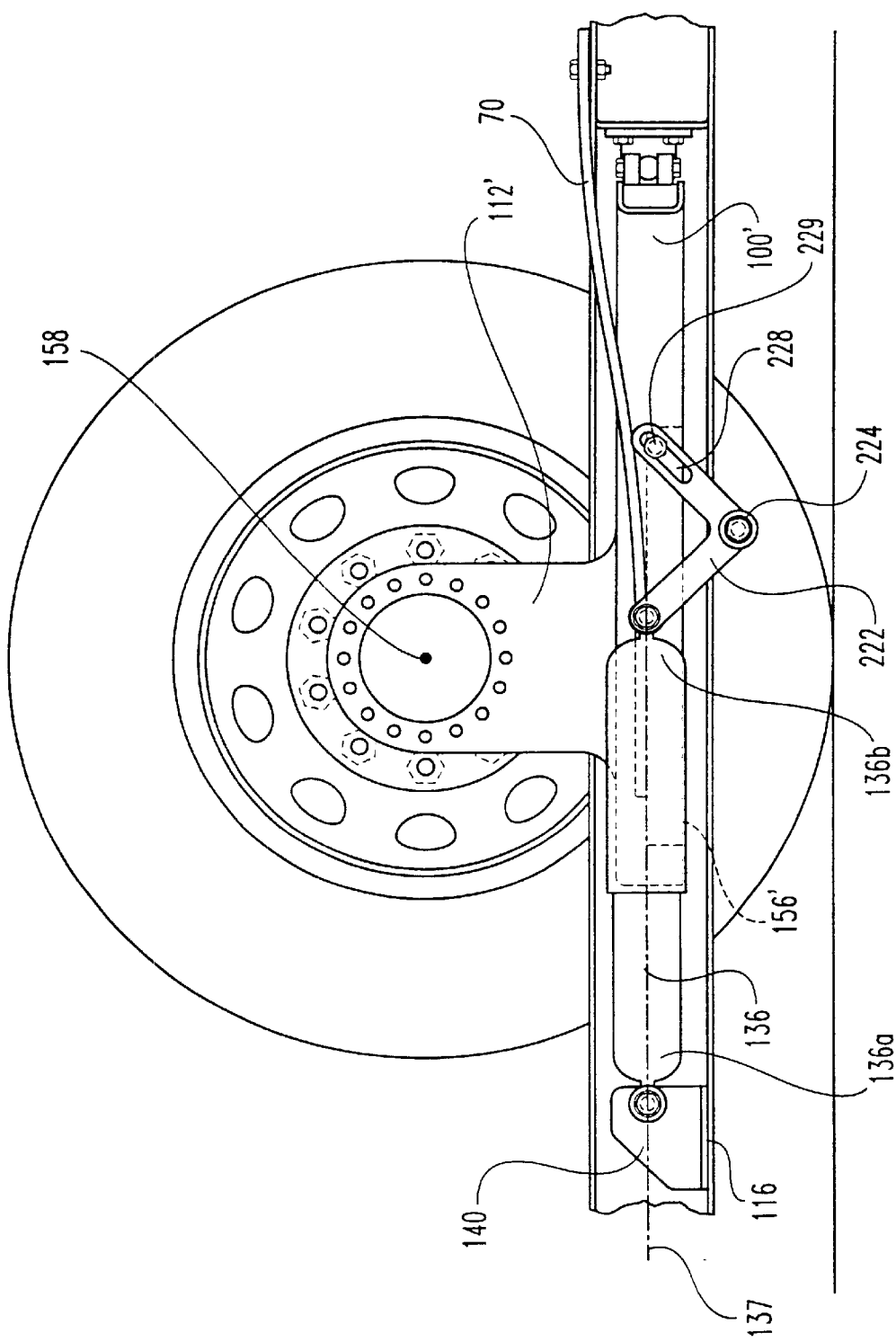
FIG. 15 is a partial side view of the vehicle section of FIG. 14 as taken along line 15—15 of FIG. 14.
Figure 16:
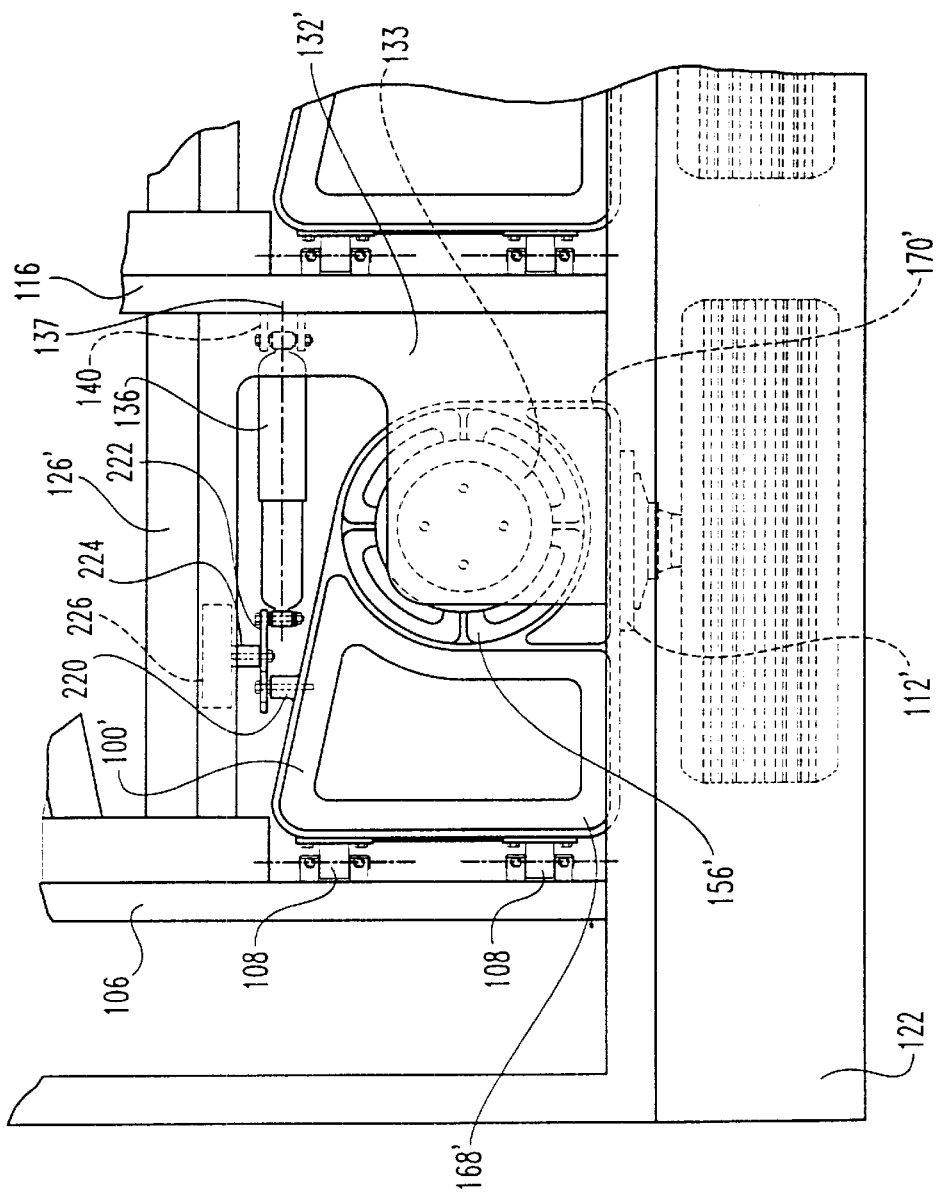
FIG. 16 is a top plan view of a vehicle section in accordance with another embodiment of the present invention.

FIGS. 14–16 depict another embodiment of the present invention in which the shock absorber is located below the rotational axis of the wheel. A wheel support 100' includes a horizontal portion 168' coupled to an upright section 112'. Horizontal portion 168' includes a spring support 156' receiving and coupling to a spring which urges wheel support 100 away from transverse frame structure 116. The use of (') and (") indicate elements of the invention substantially the same as previously described for that element, except for the changes as noted.

FIGS. 14–15 depict an embodiment in which a leaf spring 70 urges a pair of wheel supports 100' from transverse frame structure 116. Leaf spring 70 includes a first end 70a clamped by a pair of bolts to spring support 156'. A second end 70b is in sliding contact with spring support 156' of the aft-most wheel support. Ends 70a and 70b are located between their respective second spring support 156' and the rotational axis of the wheel. The center 70c of leaf spring 70 is fastened to a portion of cross-member 106 of transverse frame structure 116 which is the frame spring support. Pitching movement of either the forward-most wheel support 100' or the aft-most wheel support 100' is resisted by a biasing force from the center of the leaf spring.

Although a particular arrangement for contacting leaf spring 70 with wheel supports 100 and transverse frame structure 116 has been shown and described, those of ordinary skill in the art will recognize other suitable arrangements. For example, both ends of spring 70 could be clamped to the wheel supports, or both ends could be slidable on the wheel support. Further, the method of clamping leaf spring 70 can be one or more through fasteners, an example of which is depicted at 70c, or a fastened strap, as depicted at 70a, or other methods known in the art for clamping a leaf spring to a structure. As another example, spring 70 can pass through a frame attachment 74 as shown in FIG. 1. Further, although FIG. 14 depicts a leaf spring 70 acting upon two adjacent wheel supports, the present invention also contemplates those embodiments in which a leaf spring acts upon a single wheel support. As depicted in FIG. 16, an alternate embodiment includes an air spring 133 acting on both spring support 156' of wheel support 100' and also on spring support 132' of transverse frame structure 116.

Referring to FIGS. 14–15, shock absorber 136 is located beneath the rotational axis of the wheel so as to further simplify the structure of the wheel support, upright frame structures 122 and 124, and to further increase the cargo-carrying capability of the vehicle. Placement of shock absorber 136 is such that it acts upon horizontal portion 168' at wheel support 100', and permits elimination of support structure 134 and a generally simplified upright structure 112'. Shock absorber 136 is actuatable about an axis 137a, which is generally oriented horizontally as best seen in FIG. 15.

Shock absorber 136 has a first end 136a which is pivotally coupled to a portion of transverse frame structure 116, such as cross-member 106 or longitudinal member 126', through an attachment ear 140. A second end 136b of shock absorber 136 is pivotally attached to one end of a lever arm 222. Lever arm 222 is pivotally secured to pivot 224 which is attached to transverse frame structure 116, such as by a bracket 226 in a manner well known in the art. Lever arm 222 pivots about pivot axis 221. The other end of lever arm 222 defines a slot 228. Pinned bushing 229 is slidable in slot 228. Pinned bushing 229 is secured into a boss 220 of wheel support 100'.

Upward pitching of wheel support 100' results in compression of shock absorber 136 and sliding of pin 229 within slot 228. Downward pitching of wheel support 100' relative to transverse frame section 116 results in extension of shock absorber 136. Pinned bushing 229 and lever arm 222 are fabricated from hardened steel so as to minimize wear from sliding. Further, although an embodiment has been described and depicted in which shock absorber 136 compresses during upward pitching of wheel support 100', those of ordinary skill in the art will recognize other arrangements of pivoting lever arms that will suitably dampen the motion of wheel support 100' by extending during upward pitching.

Figure 17:
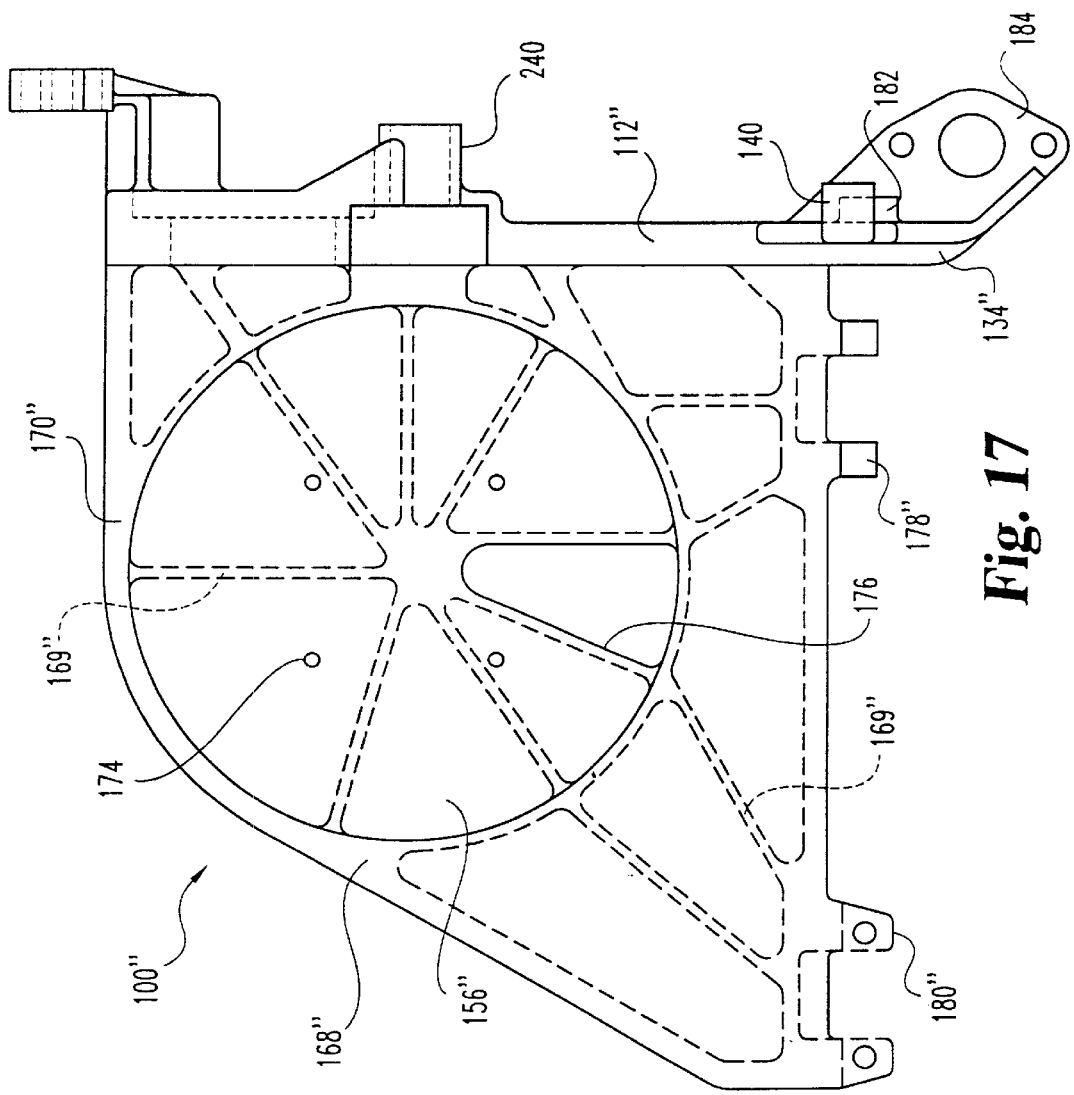
FIG. 17 is a top plan view of a wheel support according to one embodiment of the present invention.
Figure 18:
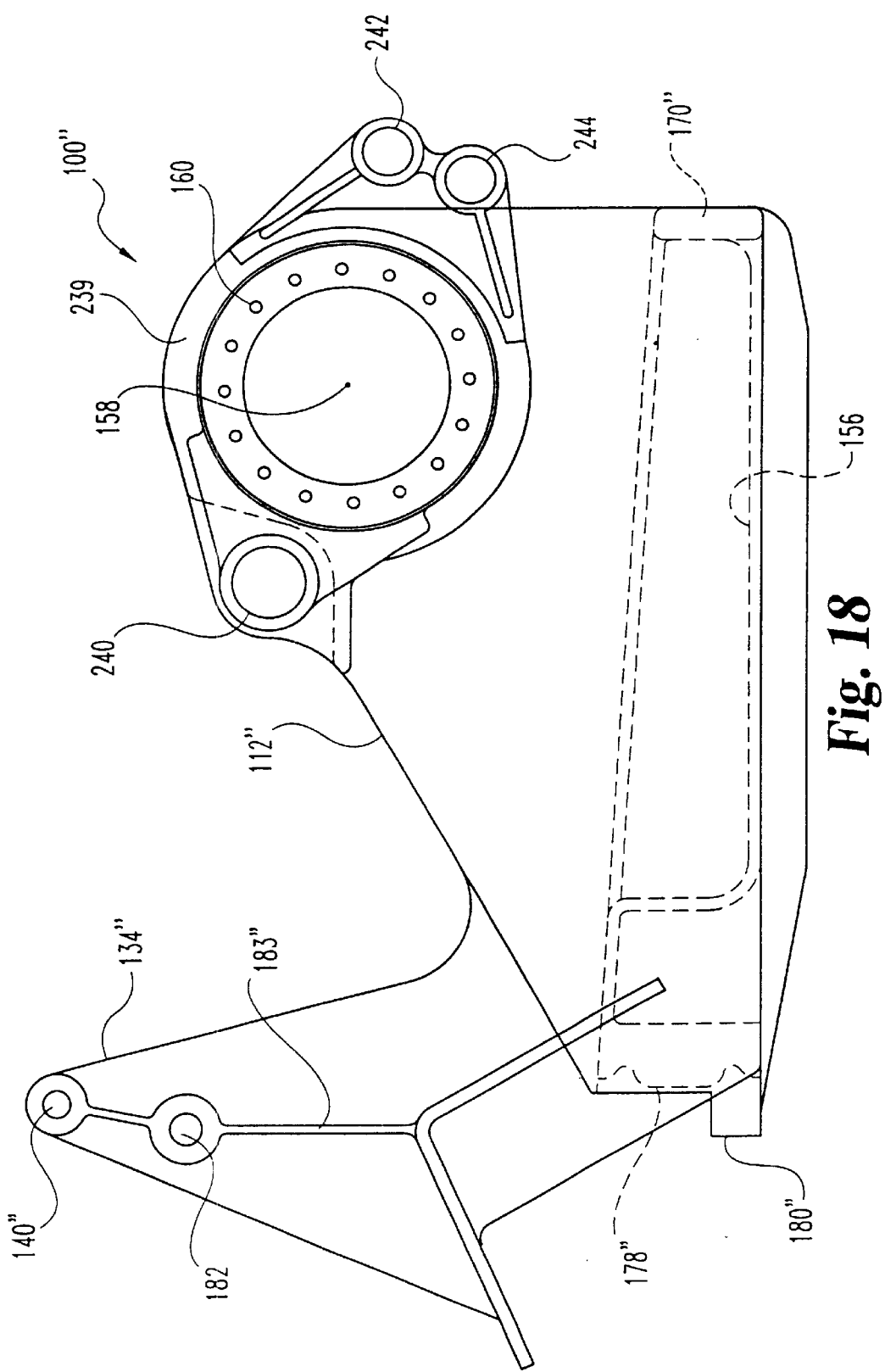
FIG. 18 is a side elevational view of the wheel support of FIG. 17.

FIGS. 17–18 depict a substantially cast wheel support 100" according to another embodiment of the present invention. Wheel support 100" includes a horizontal portion 168" cast integrally with an upright portion 112". A spring support 156" within horizontal portion 168" receives loads from a spring, and is reinforced by a plurality of cast stiffening ribs 169". A cast reinforcing member 170" stiffens and strengthens wheel support 100". Attachment members 178" and 180" are cast integrally with wheel support 100".

A support structure 134" for attaching a shock absorber and brake system components is integrally cast with upright portion 112". Upright portion 112" also includes a cast spider 239 which includes an attachment pattern of holes 240, 242, and 244 for support of brake system components (not shown) including brake shoes and an S-cam. The toe-in of wheel support 100" is adjustable by shimming in a manner as previously described. Camber is adjustable by incorporating slots in stationary outer members 108c and/or 100c of the pivotal attachments. The slots permit the orientation of outer member 108c or 100c to be adjusted relative to cross-member 106. This orientation is maintained by a friction fit provided by fasteners 177.

Figure 19:
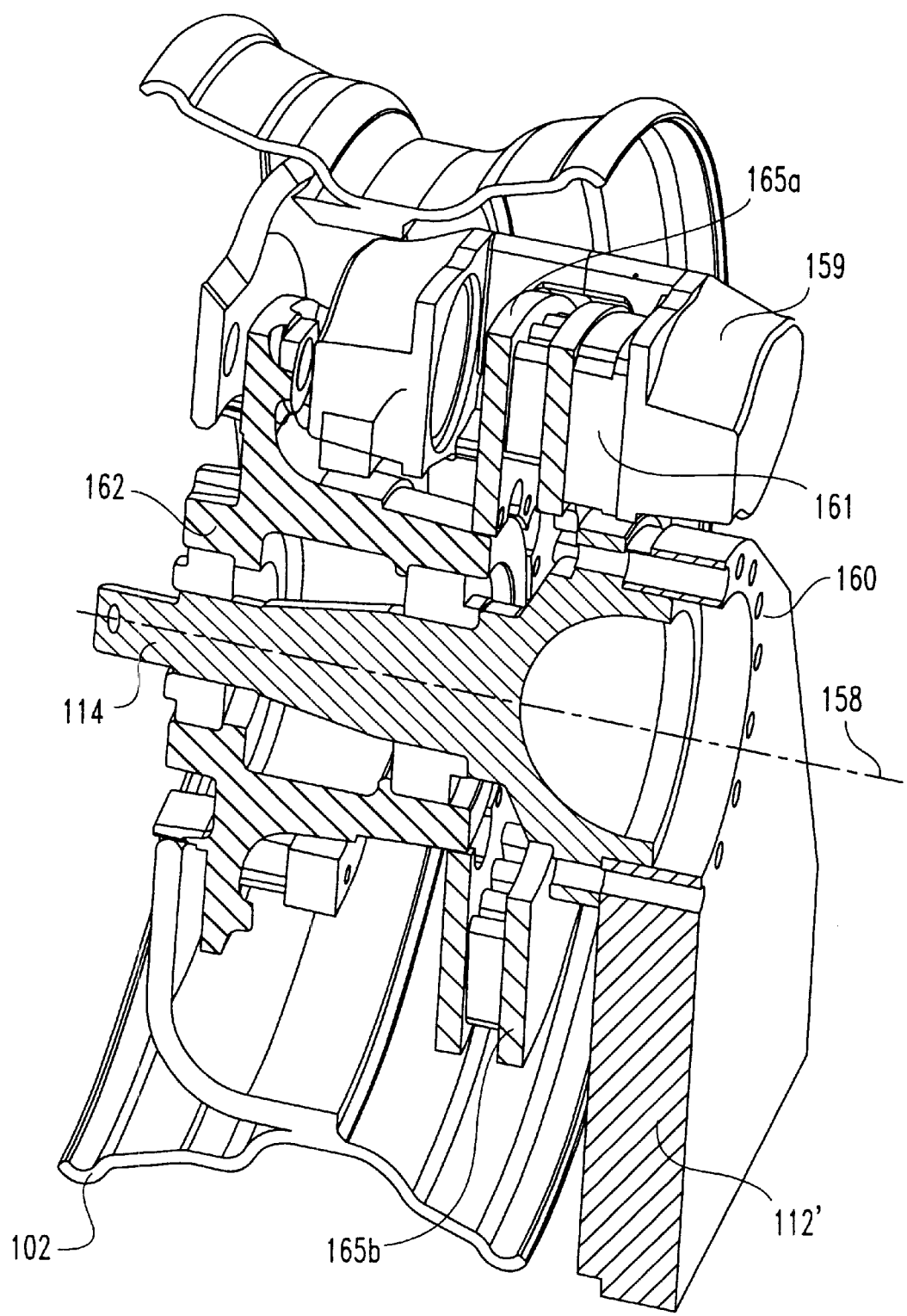
FIG. 19 is a cross-sectional, perspective view of another embodiment of the present invention.

Yet other alternate embodiments of the present invention include a wheel support and a disc brake as part of a wheel suspension system. As shown in FIG. 19, an upright section 112' is bolted to a spindle 114 by fasteners through fastener attachment pattern 160. A rotating hub 162 is bearingly supported on spindle 114. Coupled to hub 162 is a vented disc assembly 165 comprised of opposing rotor plates 165a and 165b. A caliper assembly 159 supported by upright portion 112' includes two friction pads 161 which are actuated against vented disc 165 so as to slow the vehicle. For sake of clarity, only one friction pad 161 is shown. Those of ordinary skill in the art will recognize the applicability of disc brakes to the many embodiments of the present invention.

Figure 20:
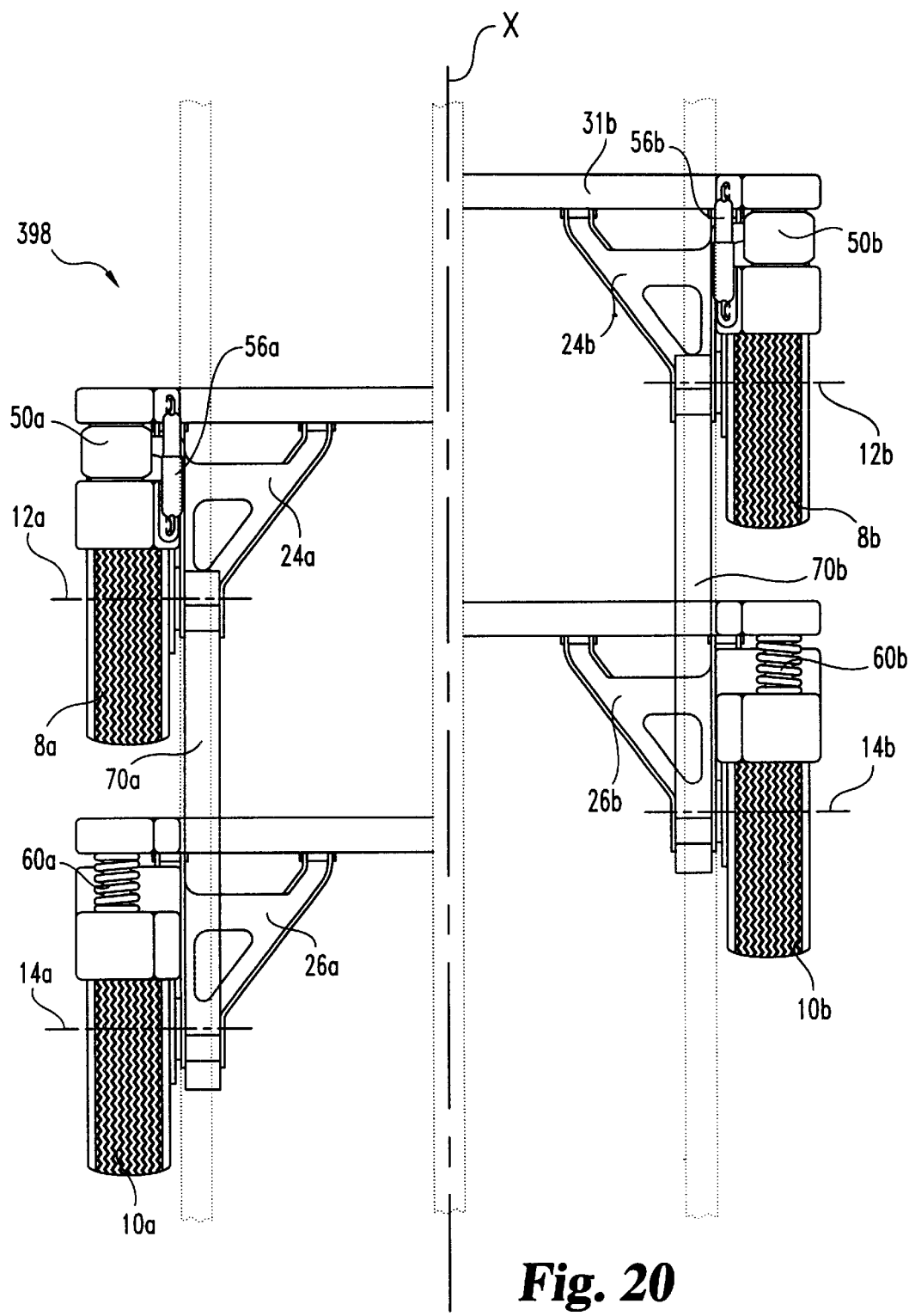
FIG. 20 is a top plan view of a frame and suspension system according to another embodiment of the present invention.
Figure 21:
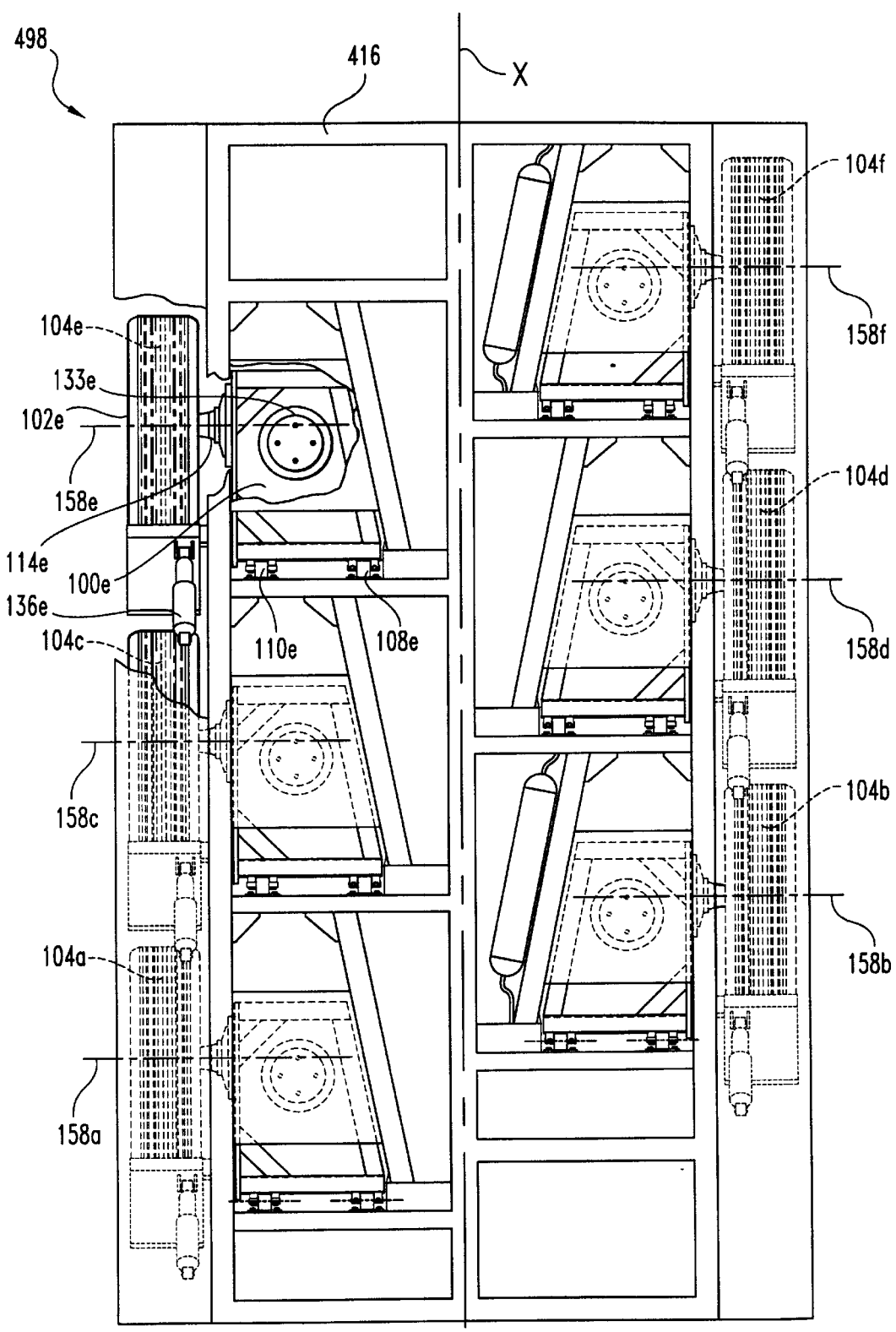
FIG. 21 is a top plan view of a frame and suspension system according to another embodiment of the present invention.
Figure 22:
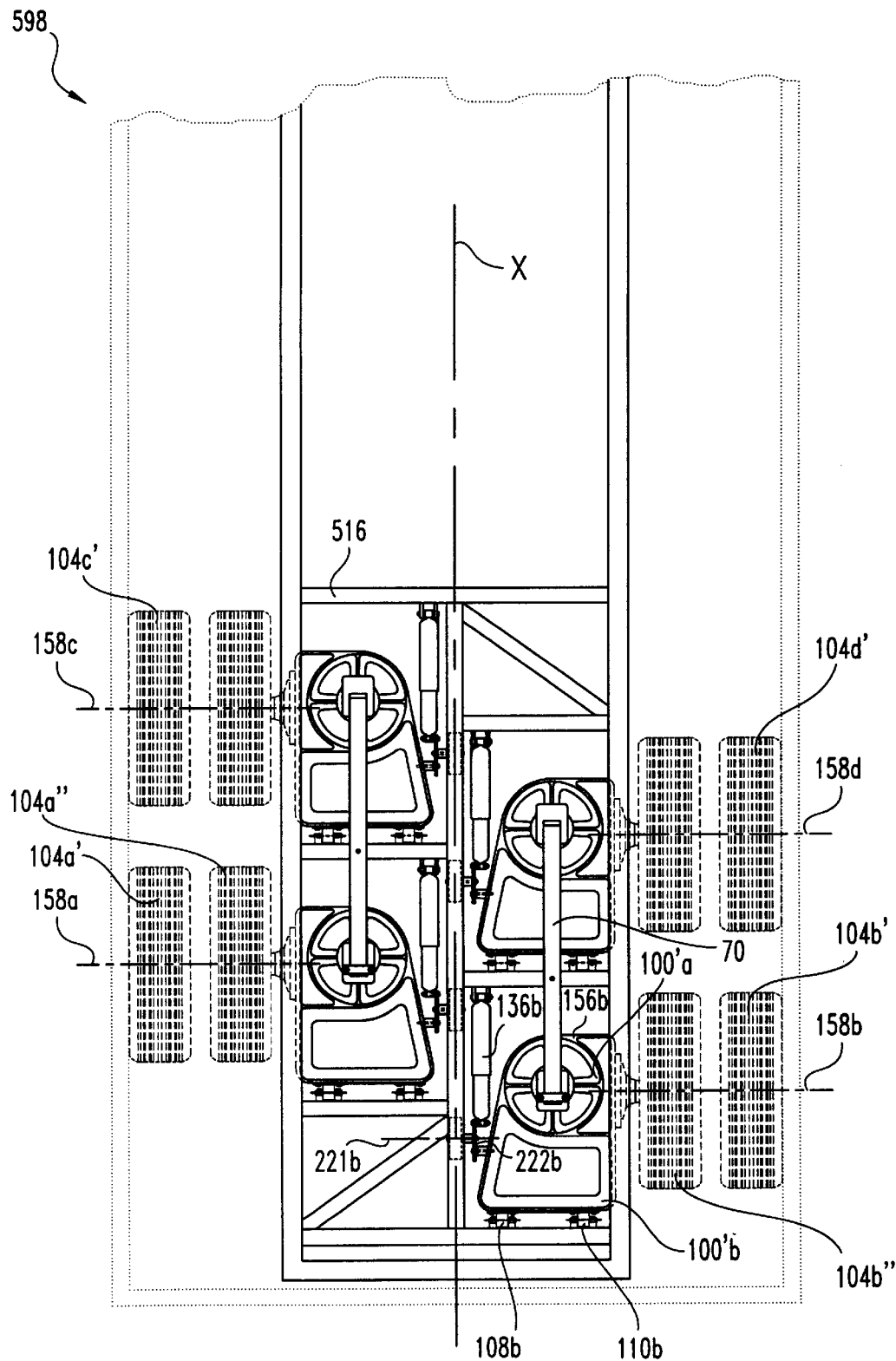
FIG. 22 is a top plan view of a frame and suspension system according to another embodiment of the present invention.

FIGS. 20, 21 and 22 depict variations of the suspension systems shown in FIGS. 3, 5 and 14, respectively, in which the wheels on one side of the vehicle are longitudinally staggered, or spaced apart, relative to wheels on the other side of the vehicle. By staggering the wheels as shown, a softer ride can be presented to the cargo or occupants, and less wear is imposed upon the roadway, especially a roadway with a disturbance that passes under the wheels on both sides of the vehicle.

In the embodiments depicted in FIGS. 20 and 22 wheel supports on a given side of the vehicle (same-side wheel supports) include one or more springs that couple the forward wheel support to the aft wheel support. In these embodiments, the motion of a same-side wheel support thereby depends, at least partly, on the motion of the other same-side wheel support. However, the present invention also includes embodiments such as the one depicted in FIG. 21, in which the motion of each wheel support is substantially independent of the motion of each other wheel support.

In some embodiments of the present invention, the extent of stagger between opposite side wheels is as great as half the distance between rotational axes of same-side wheels. However, the present invention also includes those embodiments in which the extent of stagger is less.

In the embodiments depicted in FIGS. 20–22, an even total number of rotational axes are arranged on both sides of the vehicle in an alternating longitudinal pattern, with no rotational axis being coincident with any other rotational axis. However, those of ordinary skill in the art will recognize that the present invention contemplates not only embodiments in which there is a forward-most wheel on the right side of the vehicle with an aft-most wheel on the left side, but also embodiments in which the forward-most wheel is located on the left side and the aft-most wheel is located on the right side. Further, the present invention also contemplates those embodiments in which both the forward-most and aft-most wheels are on the same side of the vehicle, and also those embodiments in which one side of the vehicle has an even number of wheels and the other side of the vehicle has an odd number of wheels, such as by way of example, a vehicle with two wheels on one side and one wheel on the other side. Further, the total number of rotational axes per frame section is as low as two, and is as great as required in the particular application.

The use of element numbers the same as numbers previously used, including element numbers with letter suffixes, indicates that the element referred to is the same, except as described.

FIG. 20 depicts an embodiment of the present invention to which the discussion herein relative to FIGS. 1, 2 and 3 is applicable, except as now described. Although a description of the "a" side components is given, those of ordinary skill in the art will recognize applicability of the description to the "b" side components. Frame and suspension section 398 of a vehicle frame includes a forward-most wheel 8a and a rear-most wheel 10a located on one side of the vehicle frame. Wheels 8a and 10a are pivotally supported by wheel supports 24a and 26a, respectively, in a manner as previously described. Wheel supports 24a and 26a are coupled together by a leaf spring 70a, also in a manner as previously described. Further, biasing members 50a, 56a and 60a are located generally above the rotational axes of the wheels, also as previously described.

The rotational axes 12a and 14a of wheels 8a and 10a, respectively, are staggered, or longitudinally spaced apart, from the rotational axes 12b and 14b of wheels 8b and 10b, respectively. In one embodiment, the four rotational axes are arranged in an alternating longitudinal pattern, with no rotational axis being coincident with any other rotational axis. Rotational axis 12a is located in this embodiment aft of rotational axis 12b, and forward of rotational axis 14b. Rotational axis 14a is located aft of all other rotational axes.

FIG. 21 depicts an embodiment of the present invention to which the description herein relative to FIG. 5 and related figures is applicable, except as now described. Although a description of the "e" components is given, those of ordinary skill in the art will recognize applicability of the description to the "a," "b," "c," "d," and "f," components. As previously described, frame and suspension section 498 of a vehicle frame includes a wheel 102e and tire 104e rotatably supported by a spindle 114e coupled to a wheel support 100e. The wheel support is pivotally attached to frame section 498 by pivotal attachments 108e and 100e. An air spring 133e biases wheel support 100e and wheel 102e to a position intermediate of an uppermost position and a lowermost position. An optional shock absorber 136e for dampening motion of wheel 102e is pivotally coupled to both wheel support 100e and frame structure 416. The rotational axes 158a, 158c, and 158e, of wheels 104a, 104c, and 104e, respectively, are staggered, or longitudinally spaced apart, from the rotational axes 158b, 158d, and 158f, of wheels 104b, 104d, and 104f, respectively. The present invention also contemplates patterns of stagger other than that shown in FIG. 21, for example, including an asymmetric pattern in which rotational axis 158b is located forward of rotational axis 158a, or in which rotational axis 158e is located aft of rotational axis 158f.

FIG. 22 depicts an embodiment of the present invention that is the same as the embodiments described herein relative to FIGS. 14, 15 and 16, except as now described. Although a description of the forward-most "b" components is given, those of ordinary skill in the art will recognize applicability of the description to the "a," "c," and "d," components. Further, although an embodiment with a leaf spring linking adjacent, same-side wheel supports is shown, those of ordinary skill in the art will recognize that the present invention also includes the embodiments depicted in FIG. 16, which include an air spring.

As shown in FIG. 22, a wheel set comprising a pair of wheels 104b' and 104b" rotatable about an axis 158b are supported by a wheel support 100b' pivotally attached to frame structure 516 by pivotal attachments 108b and 100b. The pitching movement of wheel support 100b' is dampened by shock absorber 136b, which is pivotally coupled to both frame section 516 and wheel support 100b'. Shock absorber 136b is substantially horizontal.

The rotational axes 158b and 158d of wheels 104b' and 140d', respectively, are staggered, or longitudinally spaced apart, from the rotational axes 158a and 158c of wheels 104a' and 104c'. As shown, the four rotational axes are arranged in an alternating or longitudinally spaced apart pattern, with no rotational axis of any one wheel set being coincident with the rotational axis of any other wheel set. Those of ordinary skill in the art will recognize that the present invention also contemplates those embodiments in which only wheel sets "a," "b," and "d," are present.

Figure 23:
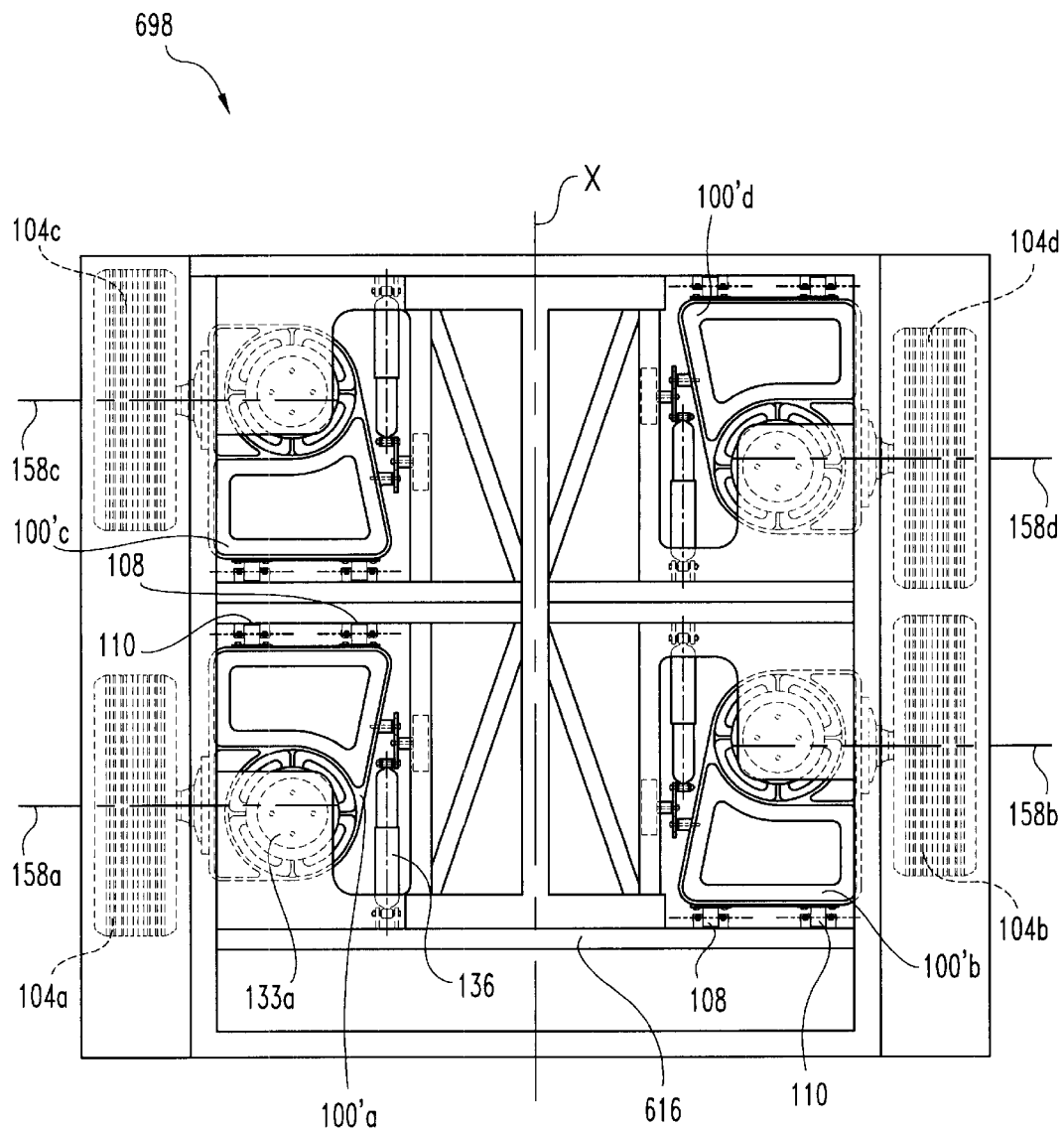
FIG. 23 is a top plan view of a frame and suspension system according to another embodiment of the present invention.

FIG. 23 depicts an embodiment of the present invention that is the same as the embodiments described herein relative to FIGS. 14, 15 and 16, except as now described. The wheel support described herein may be pivotally attached to a frame as trailing-arm wheel supports, in which the pivotal attachment of the wheel support to the frame is located forward of the rotational axis of the wheel, or as leading-arm wheel supports, in which the pivotal attachment of the wheel support to the frame is located rearward of the rotational axis of the wheel.

As seen in FIG. 23, a first wheel support 100'a rotatably supporting a wheel 104a on a first side of frame 516 has inboard pivotal attachment 108 and outboard pivotal attachment 110 located forward of rotational axis 158a. A spring, preferably an air spring 133a, urges first wheel support 100'a apart from a portion of frame 516. An end of air spring 133a is coupled to frame 516 below rotational axis 158a.

A second wheel 104b is pivotally supported by a second wheel support 100'b on the other side of frame 516 in a manner similar to that for the "a" components described above. However, inboard pivotal attachment 108 and outboard pivotal attachment 110 of wheel support 100'b are placed rearward of rotational axis 158b. By this arrangement of a trailing arm wheel support 100'a on one side of the frame and a leading-arm wheel support 100'b on the other side, it is possible to use an identical wheel support for opposing sides of the vehicle, and thus benefit from a reduction in cost of the frame and suspension section 698, and also a reduction in the number of different parts for building a frame and suspension section 698.

The present invention also contemplates those embodiments in which other combinations of leading and trailing wheel supports are utilized on a frame and suspension section. Wheels 104a and 104c are shown supported by wheel supports 100'a and 100'c, respectively, both wheel supports being pivotally supported by a common portion of frame 616. Other embodiments of the present invention include wheel supports arranged as shown in FIG. 23 with wheels 104b and 104d. Those wheels, supported by wheel supports 100'*b* and 100'*d*, respectively, may be placed close together by arranging the pivot axes of the respective wheel supports as shown. Those of ordinary skill in the art will recognize that frame and suspension section 698 as shown in FIG. 23 is but one arrangement combining leading and trailing wheel supports, and that many other arrangements are contemplated by the present invention.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. An apparatus comprising:
   a vehicle frame
   a wheel;
   a wheel support pivotally attached to said vehicle frame, said wheel support being pivotable between a first position and a second position, said wheel support rotatably supporting said wheel about a rotational axis, said wheel support including an air spring support; and
   an air spring biasing said wheel support to a position between the first and second positions, said air spring urging said wheel support apart from said vehicle frame, said wheel support receiving said air spring in said air spring support, said air spring being located below the rotational axis.

2. The apparatus of claim 1 wherein said wheel support is pivotable about a pivot axis, and the pivot axis is located the rotational axis.

3. The apparatus of claim 1 wherein said wheel support is pivotable about a pivot axis, and the pivot axis is parallel to the rotational axis.

4. The apparatus of claim 1 wherein said frame includes a first spring support, said air spring is positioned between the first spring support and the air spring support and urging the first spring support apart from the air spring support, the first spring support being located below the rotational axis and laterally inward from said wheel.

5. The apparatus of claim 1 wherein said wheel is a first wheel, said wheel support is a first wheel support, said rotational axis is a first rotational axis, and said spring is a first spring, said vehicle frame includes first and second opposing sides, said first wheel support is pivotally attached along the first side of said frame, and which further comprises:
   a second wheel;
   a second wheel support pivotally attached along the second side of said vehicle frame, said second wheel support being pivotable between a first position and a second position, said second wheel support rotatably supporting said second wheel about a second rotational axis, said second wheel support including a second air spring support; and
   a second air spring biasing said second wheel support to a position between the first and second positions, said second air spring urging said second wheel support apart from said vehicle frame, said second wheel support receiving said second air spring in said second air spring support, said second air spring being located below the second rotational axis;
   wherein said vehicle frame includes a transverse structure with a top planar surface that is generally at or below the rotation axes of said first wheel and said second wheel, said transverse structure extending between said first wheel and said second wheel.

6. The apparatus of claim 5 wherein said first wheel support is pivotable about a first pivot axis and the first pivot axis is located below the first rotational axis, and said second wheel support is pivotable about a second pivot axis and the second pivot axis is located below the second rotational axis.

7. The apparatus of claim 1 which further comprises a stub axle coupled to said wheel support and rotatably supporting said wheel in cantilevered manner and said wheel support is a trailing arm wheel support.

8. The apparatus of claim 7 wherein said wheel support supports said vehicle frame above the ground.

9. The apparatus of claim 1 wherein said vehicle frame includes a top surface that is substantially horizontal.

10. A wheel suspension system comprising:
    a vehicle frame;
    a wheel having a camber angle; and
    a wheel support coupled to said frame by a first pivotal attachment and a second pivotal attachment and pivotable about a pivot axis, said wheel support rotatably supporting said wheel for rotation about a rotational axis;
    wherein said first pivotal attachment is capable of being spaced apart from said wheel support or said frame so as to adjust the camber angle of said wheel, the rotational axis being located above the pivot axis.

11. The system of claim 10 which further comprises:
    a shim received between said first pivotal attachment and said wheel support; and
    a fastener for releaseably coupling said first pivotal attachment to said frame;
    wherein said shim spaces apart said first pivotal attachment from said wheel support or from said frame so as to adjust the camber angle.

12. The wheel suspension system of claim 10 which further comprises an air spring biasing said wheel support to a position between first and second positions, at least a portion of said air spring urging said wheel support apart from said frame, at least a portion of said air spring being located below the rotational axis.

13. The wheel suspension system of claim 10 wherein said frame includes a cross member, at least a portion of said cross member is lower than the rotational axis, and said wheel support is pivotally attached to the portion of said cross member.

14. The wheel suspension system of claim 13 wherein said frame includes a transverse structure, said wheel support is coupled to a portion of said transverse structure, and said transverse structure includes a top planar surface that is generally at or below the rotation axis.

15. The wheel suspension system of claim 14 wherein the pivot axis is located below the rotational axis and is parallel to the rotational axis.

16. The system of claim 10 wherein said wheel support supports said vehicle frame above the ground.

17. The system of claim 10 wherein said wheel support is a trailing arm wheel support.

18. The system of claim 10 which further comprises a stub axle coupled to said wheel support and rotatably supporting said wheel in cantilevered manner.

19. A wheel suspension system comprising:
    a vehicle frame;
    a wheel having a toe-in angle; and
    a wheel support coupled to said frame by a first pivotal attachment and a second pivotal attachment and pivotable about a pivot axis, said wheel support rotatably supporting said wheel for rotation about a rotational axis;

wherein said first pivotal attachment is capable of being spaced apart from said wheel support or from said frame so as to adjust the toe-in angle of said wheel, the rotational axis being located above the pivot axis.

20. The system of claim 19 wherein the vehicle frame has a first spring support disposed laterally inward of said wheel, said wheel support has a second spring support below the rotational axis, and further comprising a spring urging the first spring support apart from the second spring support.

21. The wheel suspension of claim 19 wherein said wheel has a camber angle, and which further comprises a fastener for releaseably coupling a portion of said first pivotal attachment to said frame and a shim co-acting with said first pivotal attachment for spacing apart said wheel support from said frame to adjust at least one of the camber angle or the toe-in angle.

22. The wheel suspension system of claim 14 wherein the pivot axis is located below the rotational axis and parallel to the rotational axis.

23. The wheel suspension system of claim 22 wherein said frame includes a transverse structure, said wheel support is coupled to a portion of said transverse structure, and said transverse structure includes a top planar surface that is generally at or below the rotation axis.

24. The wheel suspension system of claim 23 which further comprises an air spring urging said wheel support apart from said frame, said air spring being located below the rotational axis.

25. The wheel suspension system of claim 24 wherein said frame includes a cross member, at least a portion of said cross member is lower than the rotational axis, and said wheel support is pivotally attached to the portion of said cross member.

26. The system of claim 19 which further comprises a stub axle coupled to said wheel support and rotatably supporting said wheel in cantilevered manner and said wheel support is a trailing arm wheel support.

27. The system of claim 26 wherein said vehicle frame includes a top surface that is substantially horizontal and located at or below the rotational axis.

28. The system of claim 19 wherein said wheel support supports said vehicle frame above the ground.

29. An apparatus comprising:
a vehicle frame having a first spring support and a cross member;
a wheel;
a wheel support pivotally attached to the cross member, said wheel support being pivotable between an uppermost position and a lowermost position about a pivot axis, said wheel support rotatably supporting said wheel for rotation about a rotational axis, said wheel support having a second spring support, said cross member being lower than the rotational axis; and
a spring positioned between the first spring support and the second spring support, said spring biasing said wheel support to a position between the uppermost and lowermost positions.

30. The apparatus of claim 29 wherein the second spring support is below the rotational axis.

31. The apparatus of claim 30 wherein the first spring support is below the rotational axis.

32. The apparatus of claim 29 wherein said frame includes a transverse structure, said wheel support is coupled to a portion of said transverse structure, and said transverse structure includes a top planar surface that is generally at or below the rotation axis.

33. The apparatus of claim 32 wherein the top surface is substantially horizontal.

34. The apparatus of claim 29 wherein said spring is an air spring located below the rotational axis.

35. The apparatus of claim 29 wherein said wheel support is pivotable about a pivot axis, and the pivot axis is located below the rotational axis and is parallel to the rotational axis.

36. The apparatus of claim 35 wherein said spring is an air spring located below the rotational axis.

37. The apparatus of claim 29 wherein said wheel support supports vehicle frame above the ground.

38. The apparatus of claim 29 which further comprises a stub axle coupled to said wheel support and rotatably supporting said wheel in cantilevered manner.

39. A wheel suspension system for a vehicle comprising:
a frame with a first spring support;
a wheel;
a wheel support pivotally attached to said frame for pivoting about a pivot axis, said wheel support having a second spring support, the second spring support being located rearward of the pivot axis;
means for rotatably supporting said wheel on said wheel support, said wheel being rotatable about a rotational axis; and
a spring having an end and being positioned between the first spring support and the second spring support and urging the first spring support apart from the second spring support, the second spring support being located below the rotational axis and laterally inward from said wheel, the end of said spring being between the second spring support and the rotational axis.

40. The apparatus of claim 39 wherein the first spring support is located generally at or below the rotational axis.

41. The wheel suspension system of claim 39 wherein the pivot axis is located below the rotational axis and is parallel to the rotational axis.

42. The wheel suspension system of claim 39 wherein said wheel has a camber angle and a toe-in angle, said wheel support is attached to said frame by a first pivotal attachment, and which further comprises a fastener for releaseably coupling a portion of said first pivotal attachment to said frame and a shim co-acting with said first pivotal attachment for spacing apart said wheel support from said frame to adjust at least one of the camber angle or the toe-in angle.

43. The wheel suspension system of claim 39 wherein said frame includes a cross member, at least a portion of said cross member is lower than the rotational axis, and said wheel support is pivotally attached to the portion of said cross member.

44. The wheel suspension system of claim 39 wherein said frame includes a third spring support, said wheel is a first wheel, said wheel support is a first wheel support, said means for rotatably supporting is a first means for rotatably supporting, said pivot axis is a first pivot axis, said rotational axis is a first rotational axis, and said spring is a first spring, and which further comprises:
a second wheel;
a second wheel support pivotally attached to said frame for pivoting about a second pivot axis, said second wheel support having a fourth spring support, the fourth spring support being located rearward of the second pivot axis;
a second means for rotatably supporting said second wheel on said second wheel support, said second wheel being rotatable about a second rotational axis; and
a second spring having an end and being positioned between the third spring support and the fourth spring support and urging the third spring support apart from the fourth spring support, the fourth spring support being located below the second rotational axis and laterally inward from said second wheel, the end of said second spring being between the fourth spring support and the second rotational axis;

wherein said frame includes a transverse structure with a top planar surface that is generally at or below the rotation axes of said first wheel and said second wheel, said transverse structure extending between said first wheel and said second wheel.

45. The system of claim 39 wherein said wheel support is trailing arm wheel support.

46. The system of claim 45 wherein said wheel support supports said frame above the ground.

47. A wheel suspension system for a vehicle comprising:
a frame having a transverse structure;
a wheel;
a wheel support coupled to the transverse structure by first and second pivotal attachments and pivotable between an uppermost position and a lowermost position, said wheel support rotatably supporting said wheel for rotation about a rotational axis, said first and second pivotal attachments being located forward of said rotational axis; and
a spring biasing said wheel support to a position between the uppermost and lowermost positions, said spring being coupled to said wheel support below the rotational axis, said spring being coupled to the transverse structure, the transverse structure defining a plane that is at or below the rotational axis.

48. The apparatus of claim 47 wherein said wheel support couples to said spring laterally inward from said wheel.

49. The wheel suspension system of claim 47 wherein said spring is an air spring located below the rotational axis.

50. The wheel suspension system of claim 47 wherein said wheel support is pivotable about a pivot axis, and the pivot axis is located below the rotational axis and parallel to the rotational axis.

51. The wheel suspension system of claim 50 wherein said frame includes a cross member, at least a portion of said cross member is lower than the rotational axis, and said wheel support is pivotally attached to the portion of said cross member.

52. The system of claim 47 which further comprises a stub axle coupled to said wheel support and rotatably supporting said wheel in cantilevered manner.

53. The system of claim 52 wherein said wheel support supports said vehicle frame above the ground.

54. A suspension system for a vehicle, comprising:
a frame;
a wheel;
a wheel support pivotally attached to said frame and pivotal about a pivot axis, said wheel support rotatably supporting said wheel about a rotational axis, the pivot axis being located below the rotational axis and said air spring is located below the rotational axis;
an air spring positioned between said frame and said wheel support;
a source of compressed air; and
a valve operably coupled to said source and said air spring and capable of placing said air spring in fluid communication with said source or in fluid communication with ambient air;
wherein said valve places said air spring in fluid communication with said source or with ambient air in response to pivoting of said wheel support.

55. The suspension system of claim 54 wherein the pivot axis is parallel to the rotational axis.

56. The suspension system of claim 54 wherein said frame includes a transverse structure, said wheel support is coupled to a portion of said transverse structure, and said transverse structure includes a top planar surface that is generally at or below the rotation axis.

57. The suspension system of claim 40 wherein the portion of said transverse structure is a cross member, at least a portion of said cross member is lower than the rotational axis, and said wheel support is pivotally attached to the portion of said cross member.

58. The suspension system of claim 54 wherein said air spring couples to said wheel support laterally inward of said wheel.

59. The system of claim 54 which further comprises a stub axle coupled to said wheel support and rotatably supporting said wheel in cantilevered manner and said wheel support is trailing arm wheel support.

60. The system of claim 54 wherein said wheel support supports said vehicle frame above the ground.

61. A wheel suspension system for a vehicle comprising:
a wheel rotatable about a rotational axis;
a frame with a transverse structure, the transverse structure being below the rotational axis;
a wheel support pivotally attached to the transverse structure and pivotable about a pivot axis between an uppermost position and a lowermost position, said wheel support rotatably supporting said wheel, the pivot axis being below the rotational axis;
a spring coupled to said frame and coupled to said wheel support for biasing said wheel support to a position intermediate of the uppermost and lowermost positions; and
a shock absorber for dampening the motion of said wheel support, said shock absorber having two ends, one of the ends of said shock absorber being coupled to the transverse structure, said shock absorber being located substantially below the rotational axis.

62. The apparatus of claim 61 which further comprises a lever arm pivotally attached to said frame, said lever arm having two ends, one end of said lever arm being coupled to said wheel support, the other end of said lever arm being coupled to the other end of said shock absorber.

63. The apparatus of claim 43 wherein said shock absorber has an axis about which said shock absorber is actuated, and the axis is generally horizontal.

64. The wheel suspension system of claim 61 wherein said spring is an air spring located below the rotational axis.

65. The wheel suspension system of claim 43 wherein the pivot axis is parallel to the rotational axis.

66. The wheel suspension system of claim 65 wherein said spring is an air spring and said air spring couples to said wheel support laterally inward of said wheel.

67. The wheel suspension system of claim 61 wherein said frame includes a first spring support, said wheel support includes a second spring support, and said spring has an end being positioned between the first spring support and the second spring support and urging the first spring support apart from the second spring support, the second spring support being located below the rotational axis and laterally inward from said wheel, the end of said spring being between the second spring support and the rotational axis.

68. The system of claim 61 wherein said wheel support is a trailing arm wheel support.

69. The system of claim 68 wherein said wheel support supports said vehicle frame above the ground.

* * * * *

UNITED STATES PATENT AND TRADEMARK OFFICE
CERTIFICATE OF CORRECTION

PATENT NO. : 6,398,251 B1
DATED : June 4, 2002
INVENTOR(S) : Earl Dallas Smith

It is certified that error appears in the above-identified patent and that said Letters Patent is hereby corrected as shown below:

Column 19,
Line 32, please insert the word -- below -- immediately after the word "located".

Signed and Sealed this

Twelfth Day of October, 2004

JON W. DUDAS
*Director of the United States Patent and Trademark Office*

UNITED STATES PATENT AND TRADEMARK OFFICE
CERTIFICATE OF CORRECTION

PATENT NO. : 6,398,251 B1 Page 1 of 1
DATED : June 4, 2002
INVENTOR(S) : Earl Dallas Smith It is certified that error appears in the above-identified patent and that said Letters Patent is hereby corrected as shown below:

Column 12,
Line 49, delete "180" and insert in lieu thereof -- 178 --.

Signed and Sealed this

Twentieth Day of September, 2005

JON W. DUDAS
*Director of the United States Patent and Trademark Office*